(12) United States Patent
Zhao et al.

(10) Patent No.: US 11,361,417 B2
(45) Date of Patent: Jun. 14, 2022

(54) AIRCRAFT-UTILIZING DETERIORATION DIAGNOSIS SYSTEM

(71) Applicant: Hitachi Systems Ltd., Tokyo (JP)

(72) Inventors: Yu Zhao, Tokyo (JP); Jun-ichiro Watanabe, Tokyo (JP); Masato Nakamura, Tokyo (JP); Ryouichi Ueda, Tokyo (JP); Kentarou Oonishi, Tokyo (JP); Yoshihito Narita, Tokyo (JP)

(73) Assignee: Hitachi Systems Ltd., Tokyo (JP)

( * ) Notice: Subject to any disclaimer, the term of this patent is extended or adjusted under 35 U.S.C. 154(b) by 138 days.

(21) Appl. No.: 16/645,390

(22) PCT Filed: Aug. 24, 2018

(86) PCT No.: PCT/JP2018/031365
§ 371 (c)(1),
(2) Date: Mar. 6, 2020

(87) PCT Pub. No.: WO2019/073704
PCT Pub. Date: Apr. 18, 2019

(65) Prior Publication Data
US 2021/0358102 A1    Nov. 18, 2021

(30) Foreign Application Priority Data
Oct. 11, 2017   (JP) .............................. JP2017-198046

(51) Int. Cl.
*G06T 7/00*      (2017.01)
*B64C 39/02*     (2006.01)
(Continued)

(52) U.S. Cl.
CPC .......... *G06T 7/0002* (2013.01); *B64C 39/024* (2013.01); *B64D 47/08* (2013.01);
(Continued)

(58) Field of Classification Search
CPC ......... G06T 7/0002; G06T 2207/10032; G06T 2207/20081; G06T 2207/30184;
(Continued)

(56) References Cited

U.S. PATENT DOCUMENTS 10,796,425 B1 * 10/2020 Patel ..................... B64C 39/024
2010/0215212 A1   8/2010 Flakes, Jr.
(Continued)

FOREIGN PATENT DOCUMENTS

JP      2013-186816 A    9/2013
JP       2013186816 A    9/2013
(Continued)

OTHER PUBLICATIONS

Chinese Intellectual Property Office, Office Action for Chinese Application No. 2017-198046, dated Apr. 6, 2021.

*Primary Examiner* — Nasim N Nirjhar
(74) *Attorney, Agent, or Firm* — SoCal IP Law Group LLP; Mark Andrew Goldstein

(57) ABSTRACT

The present invention relates to an aircraft-utilizing deterioration diagnostic system and provides a technique capable of improving diagnostic efficiency and accuracy when comparing the previous and current aerially-photographed images to diagnose a deteriorated state of a target. The diagnostic system includes: a drone 1 (aircraft) configured to be navigated along a route around a target 5 and having a camera 4 configured to photograph the target 5; and a computer (PC 2 and server 3) configured to control navigation of the aircraft and photographing by the camera 4. The computer is configured to: acquire data from the aircraft including an image group obtained by consecutively photographing the target 5 for each predetermined date and time; based on diagnostic data including a diagnostic image group photographed at a current date and time, reference data including a reference image group of a previous date
(Continued)

and time, associate, for the same target 5, images including the same portion as comparison target images; compare the previous image and the current image among the comparison target images to detect a deteriorate portion; and provide a screen converted and visualized for the user such that the deteriorated portion in the image is plotted on the three-dimensional model of the target.

19 Claims, 25 Drawing Sheets

(51) Int. Cl.
*B64D 47/08* (2006.01)
*G05D 1/00* (2006.01)
*G05D 1/10* (2006.01)
*H04N 5/232* (2006.01)

(52) U.S. Cl.
CPC ........... *G05D 1/0094* (2013.01); *G05D 1/101* (2013.01); *H04N 5/23206* (2013.01); *B64C 2201/027* (2013.01); *B64C 2201/127* (2013.01); *G06T 2207/10032* (2013.01); *G06T 2207/20081* (2013.01); *G06T 2207/30184* (2013.01)

(58) Field of Classification Search
CPC .. H04N 5/23206; G05D 1/101; G05D 1/0094; B64C 39/024; B64C 2201/027; B64C 2201/127; B64D 47/08
See application file for complete search history.

(56) References Cited

U.S. PATENT DOCUMENTS

| | | | |
|---|---|---|---|
| 2013/0236107 A1 | 9/2013 | Fukaya et al. | |
| 2017/0018113 A1 | 1/2017 | Lattanzi et al. | |
| 2017/0206648 A1 | 7/2017 | Marra et al. | |
| 2018/0170540 A1* | 6/2018 | Claybrough | G05D 1/0094 |
| 2018/0365853 A1* | 12/2018 | Yang | G06T 7/75 |
| 2019/0178814 A1* | 6/2019 | Nakano | G01B 11/026 |
| 2020/0184622 A1* | 6/2020 | Chaudhury | G06T 7/248 |

FOREIGN PATENT DOCUMENTS

| | | |
|---|---|---|
| JP | 2014106725 A | 6/2014 |
| JP | 2017078575 A | 4/2017 |
| JP | 2017138162 A | 8/2017 |
| WO | 2016/203151 A1 | 12/2016 |
| WO | 2016203151 A1 | 12/2016 |
| WO | 2017119202 A1 | 7/2017 |

\* cited by examiner

FIG. 4
EMBODIMENT: OVERVIEW (ASSOCIATION AND COMPARISON)
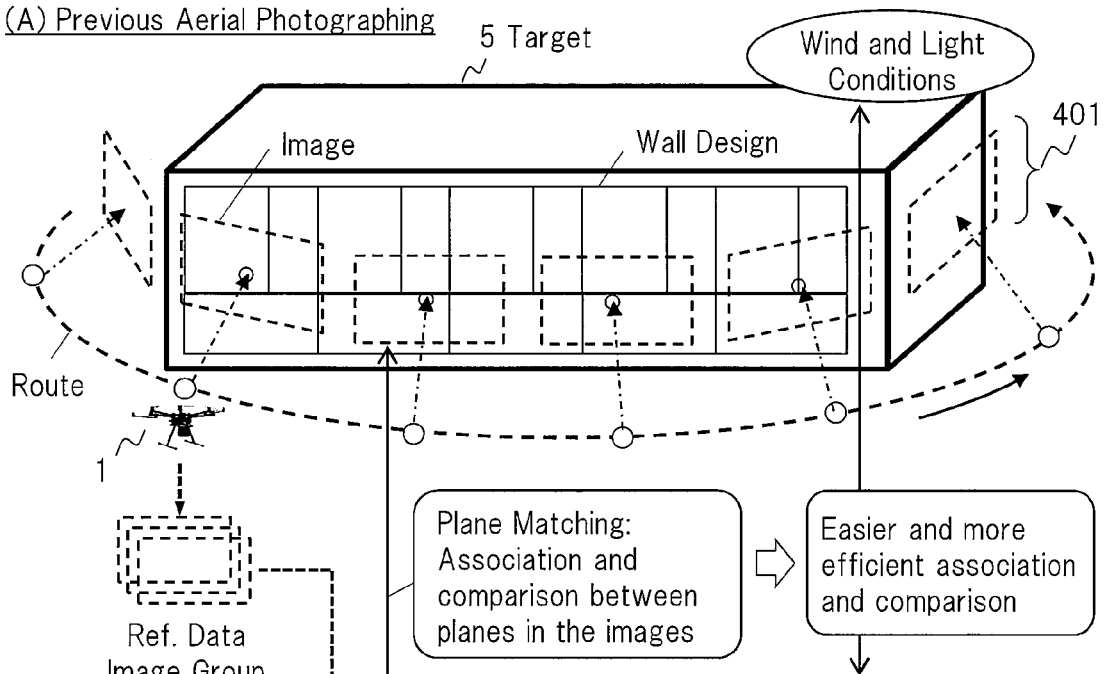
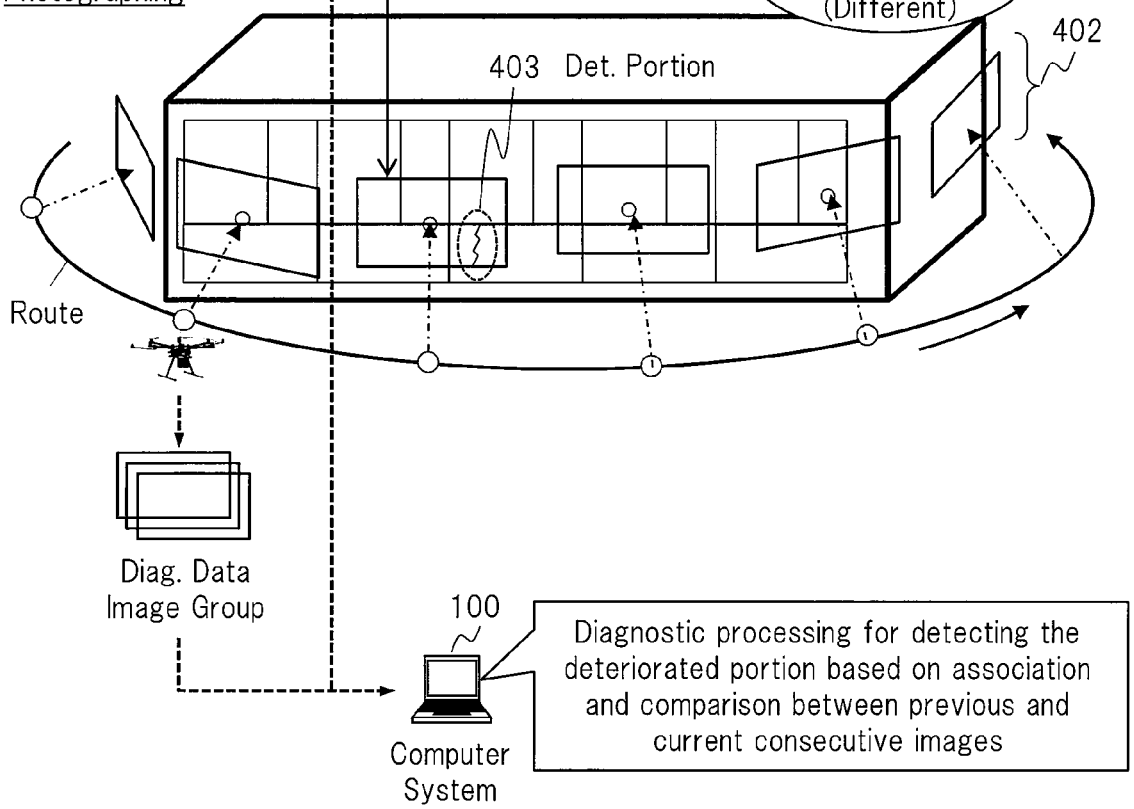

DIAGNOSTIC PROCESSING: PLANE MATCHING METHOD

MODIFICATION EXAMPLE:
COORDINATE CONVERSION USING PLANE CONVERSION METHOD

DETERIORATED PORTION INFORMATION (A) Table of 2D-Image Data

| Image File | Image Size | Det. Portion ID | 2D-Coordinates (x,y) of Det. Portion |
|---|---|---|---|
| 001.jpg | 6000 x 4000 | 001-1 | (120, 500) |
| | | 001-2 | (1560, 2440) |
| 002.jpg | 6000 x 4000 | 002-1 | (820, 3020) |
| | | 002-2 | (530,400) |
| | | 002-3 | (5000,2600) |
| ... | ... | ... | ... |
| 100.jpg | 6000 x 4000 | 100-1 | (2200,1030) |
| | | 100-2 | (50,1340) |

Convert (B) Table of 3D-Model Data

| Det. Portion ID | 3D-Coordinates (X,Y,Z) of Det. Portion | Corresponding 2D-Image File |
|---|---|---|
| 001 | (100, 200,33) | 001.jpg,002.jpg |
| 002 | (110,400,40) | 003.jpg,004.jpg,005.jpg |
| 003 | (200,320,66) | 006.jpg,007.jpg |
| 004 | (90,15,20) | 008.jpg,009.jpg,010.jpg,011.jpg |
| 005 | (500,200,160) | 012.jpg,013.jpg |
| ... | ... | ... |

FIG. 13

VISUALIZATION OF DETERIORATED PORTION (1)

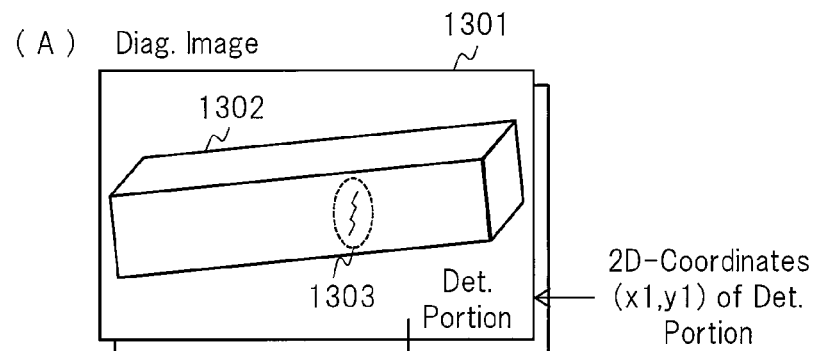

(A) Diag. Image

2D-Coordinates (x1,y1) of Det. Portion

Plotting (Converting) and Visualizing from 2D-Image to Target 3D-Model

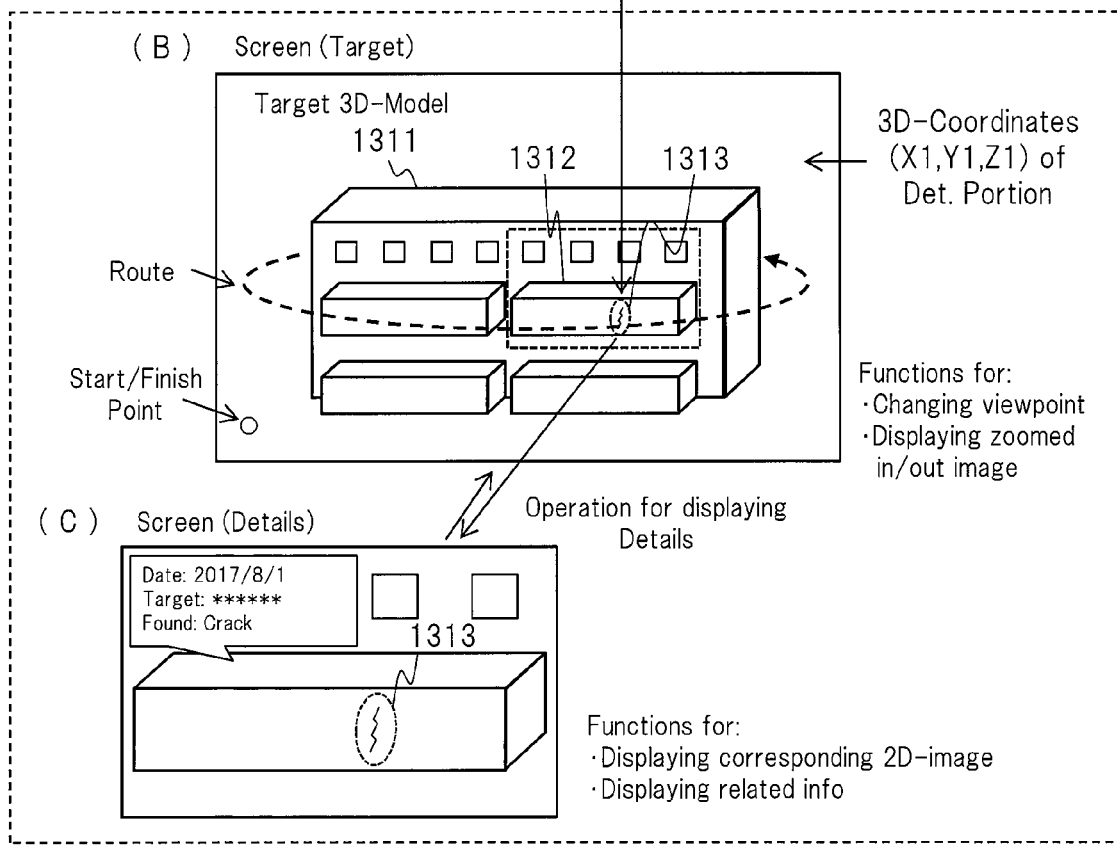

(B) Screen (Target)

3D-Coordinates (X1,Y1,Z1) of Det. Portion

Functions for:
· Changing viewpoint
· Displaying zoomed in/out image (C) Screen (Details)

Operation for displaying Details

Functions for:
· Displaying corresponding 2D-image
· Displaying related info

FIG. 15

MODIFICATION EXAMPLE: ROUTING METHOD (A) Basic Route and Photo. Setting Information

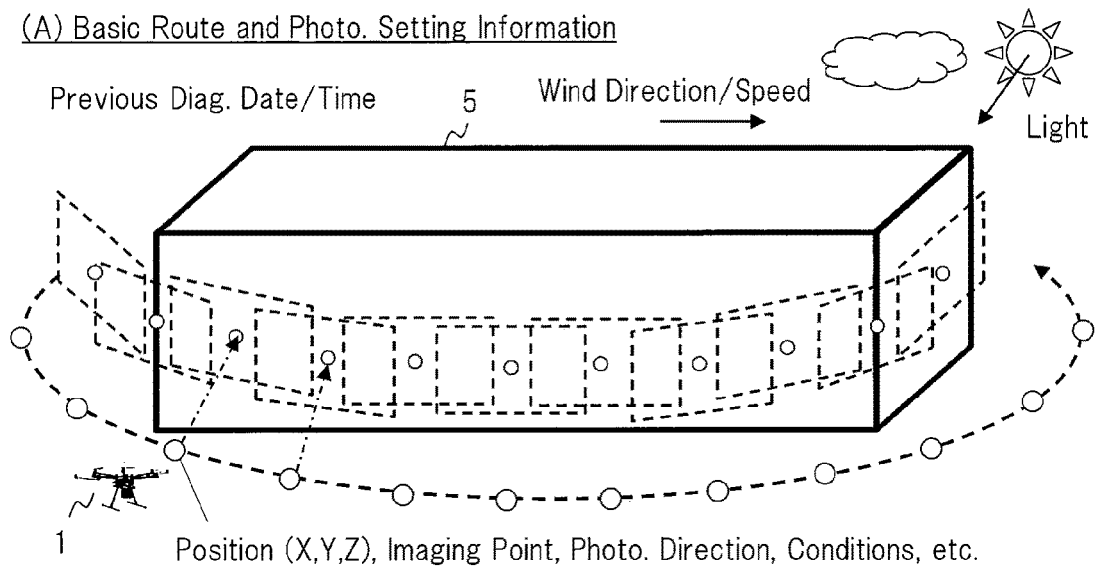

Position (X,Y,Z), Imaging Point, Photo. Direction, Conditions, etc.

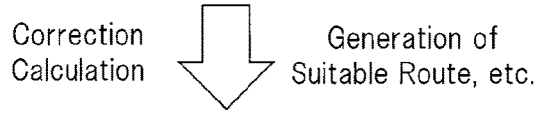

Correction Calculation / Generation of Suitable Route, etc.

(B) Correction Route and Photo. Setting Information

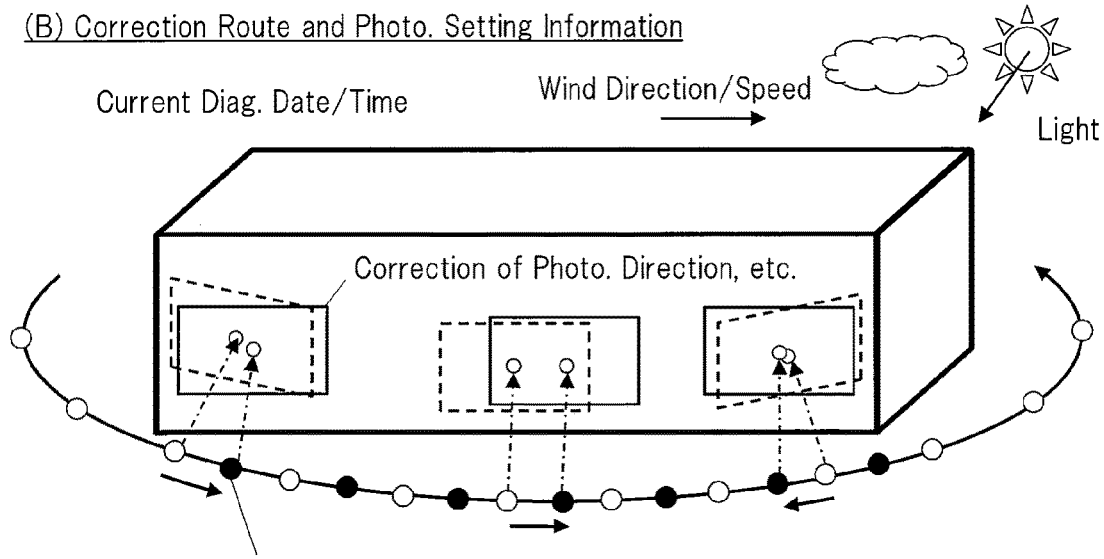

Correction of Position, Imaging Point, Photo. Direction, Conditions, etc.
- Ex.. Set the diagnosis date/time to a date/time in which light is more likely to hit
- Ex.. Correct the photographing direction or conditions for regions in which light is less likely to hit
- Ex.. Correct the photographing point and intervals according to wind direction and the like

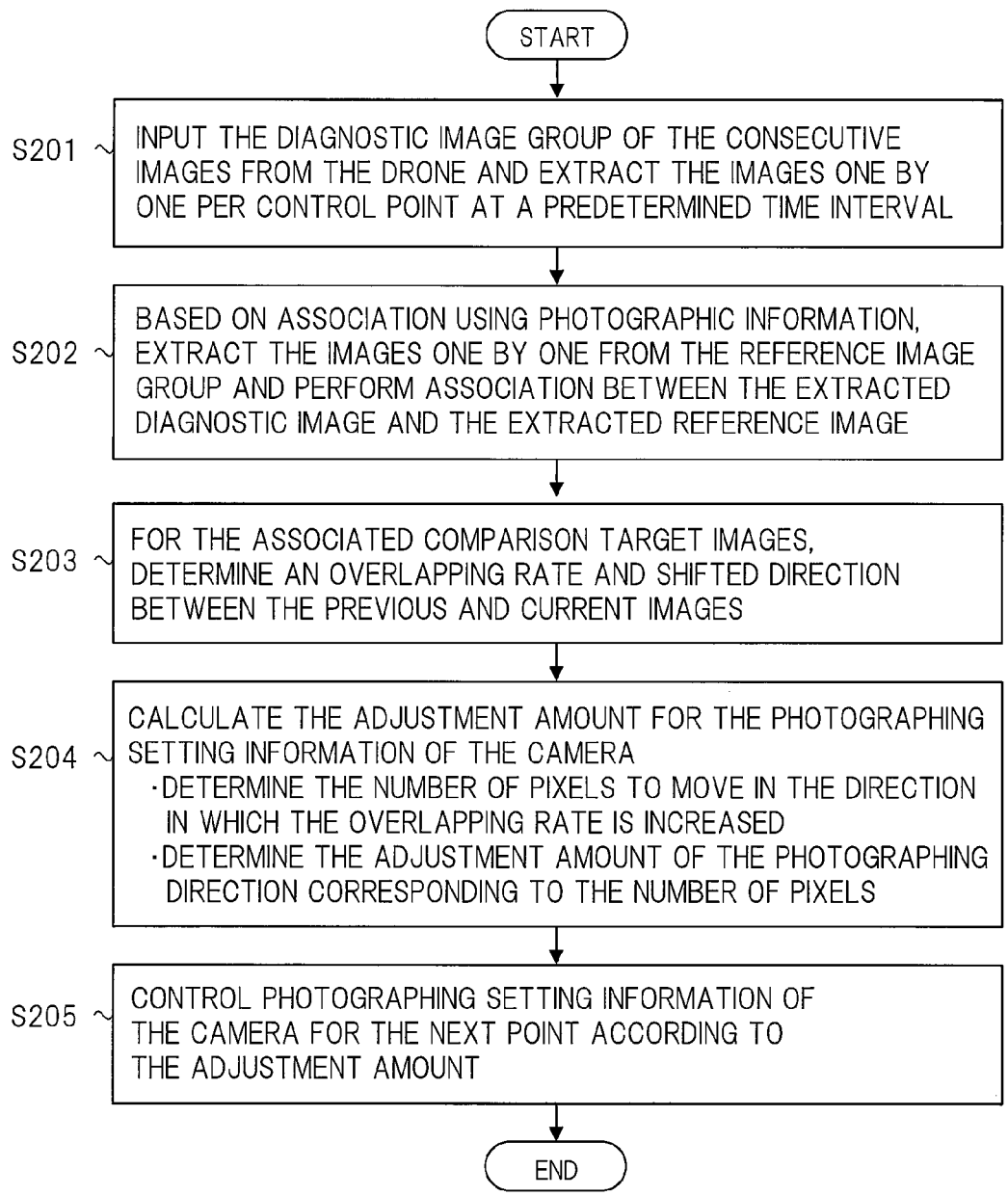

FIG. 19

MODIFICATION EXAMPLE: STEPWISE ASSOCIATION METHOD (A) Ref. Image Group

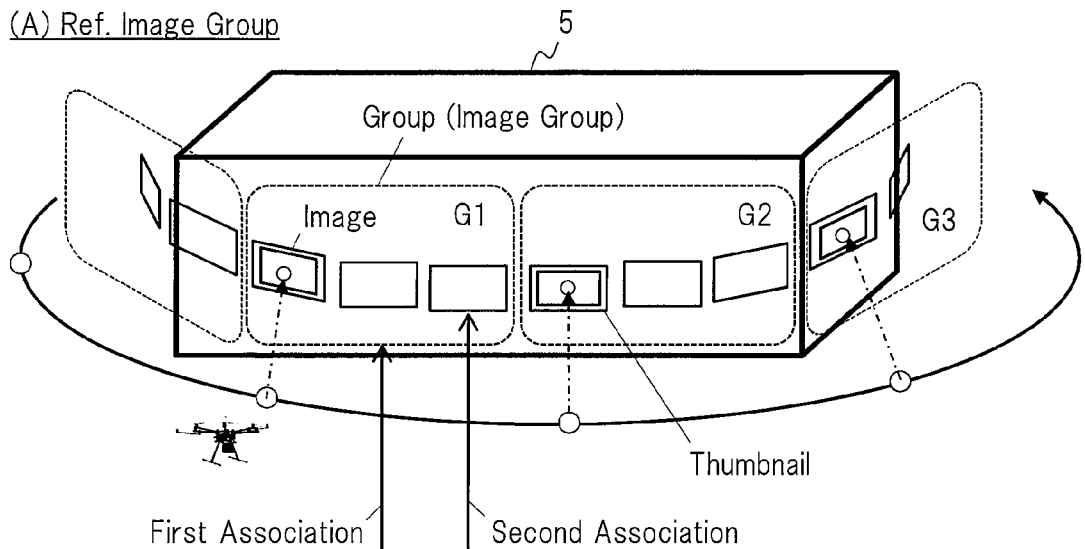

(B) Diag. Image Group

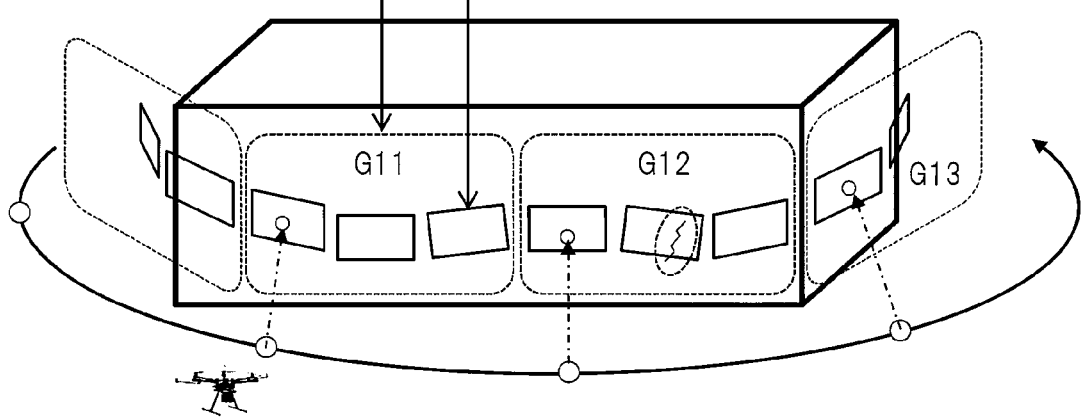

○ Grouping Settings:
　・Group per Target 3D-Model Region
　・Group by Photo. Direction, etc.
○ Association Processing:
　　First Association: Association per Group
　　　・Ex.: Using thumbnail information
　　Second Association: Association per Image in Group
　　　・Plane-Level Matching, or
　　　・Image-Level Matching (Minutiae-Based)

FIG. 22
DIFFERENT EMBODIMENT
TARGET: UTILITY POLES AND ELECTRIC WIRES
(A) Aerially-Photographed Image
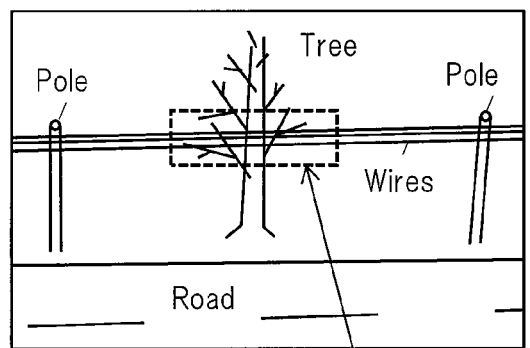
2D-Coordinates (x,y) of Possible
(Estimated) Contacting Portion
 Plotting from 2D to 3D
(B) Screen including Target 3D-Model
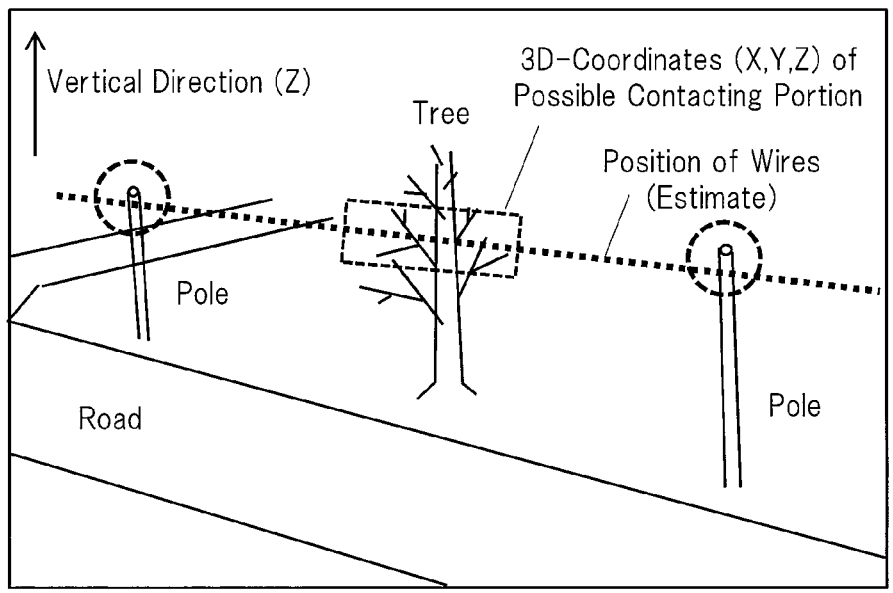

FIG. 25
COMPARATIVE EXAMPLE (3)
(A) Association and Comparison between Previous and Current Image Groups
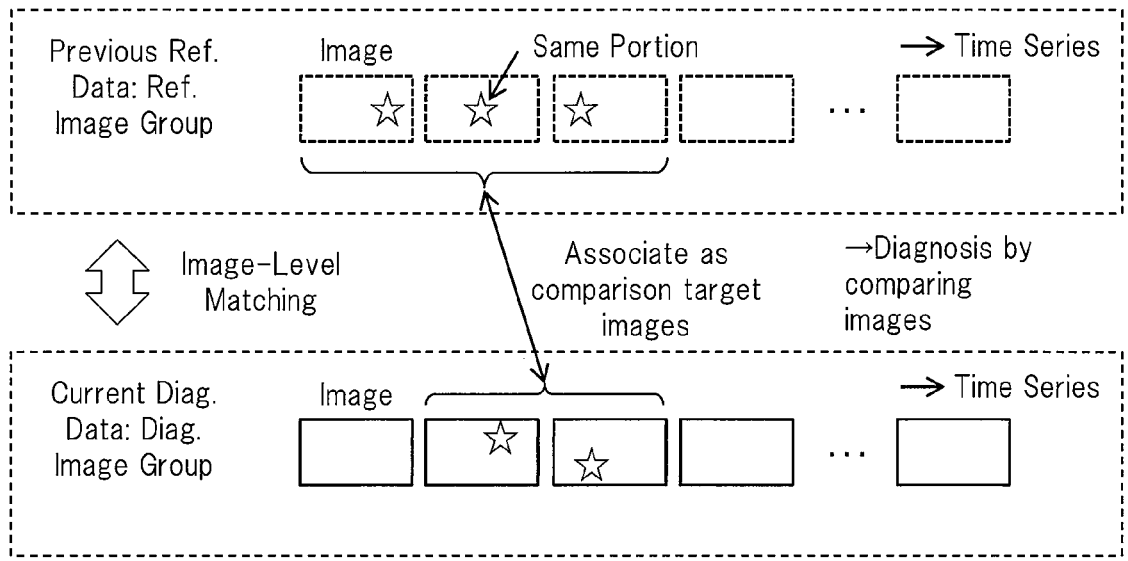
(B) Previous Image Example
Date: 2016/1/1
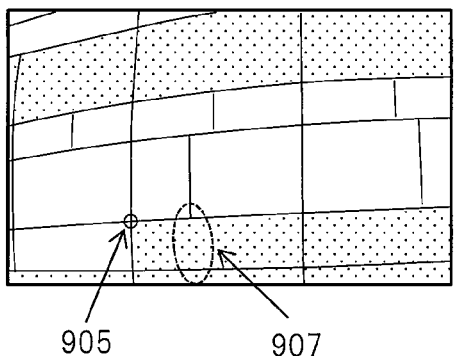
(C) Current Image Example
Date: 2017/1/1
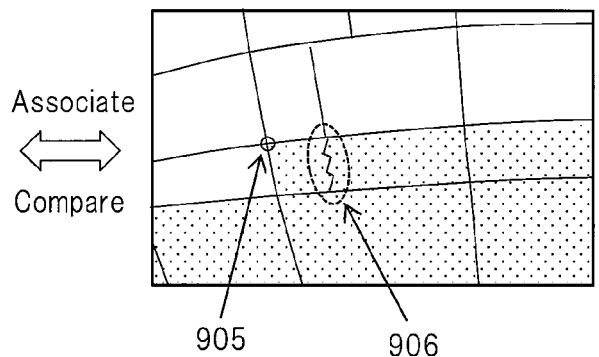

AIRCRAFT-UTILIZING DETERIORATION DIAGNOSIS SYSTEM

RELATED APPLICATION INFORMATION

This patent claims priority from International PCT Patent Application No. PCT/JP2018/031365, filed Aug. 24, 2018 entitled, "AIRCRAFT-UTILIZING DETERIORATION DIAGNOSIS SYSTEM", which claims priority to Japanese Patent Application No. 2017-198046, filed Oct. 11, 2017, of which are incorporated herein by reference in their entirety

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to a technique of an information processing system and the like that utilizes an aircraft such as a drone or an unmanned aerial vehicle (UAV). The present invention particularly relates to a technique of photographing a target structure utilizing a camera of the aircraft, and diagnosing and inspecting a deteriorated state or the like of the target structure.

BACKGROUND ART

An unmanned aircraft such as a drone or a UAV can be autonomously navigated based on remote or automatic controls and wireless communication, and can perform aerial photographing using a camera. Systems that achieve various services by utilizing an aircraft such as a drone and aerially-photographed images taken by the aircraft have been proposed. Examples of such services include a diagnostic system (occasionally referred to as aircraft-utilizing deterioration diagnostic system or the like) which photographs a target structure using a camera of the aircraft and diagnoses a deteriorated state or the like. Such a diagnostic system is expected to be effective for social issues such as aging of structures including buildings and infrastructure facilities, reduction in the number of workers dispatched for inspection and repairs, and high cost issues.

In such a diagnostic system, the target is aerially photographed by using, for example, a camera while the drone is autonomously navigated such that image groups including a wide range of images of the target can be collected with minimal manpower. A computer performs image analysis processing or the like using the image groups to diagnose and detect the portion of the target that is in, for example, a deteriorated, abnormal or changed state. As a result, for example, a deteriorated portion such as a cracked, rusted, corroded or peeled portion on a surface of the target can be found. Alternatively, a changed portion such as a renovated portion or a portion on which foreign matters are adhered can be found. This makes it possible to support diagnosis and inspections performed in person and improve efficiency.

In a case of a method in which, for example, a high-altitude wall of a building or the like is diagnosed, there are problems such as requiring a specific device which would lead to high costs and increase risk of dangers for the workers.

An example of a prior art related to a diagnostic system that utilizes an aircraft is Japanese Patent Application Laid-Open Publication No. 2017-78575 (Patent Document 1). Patent Document 1 discloses an inspection system or the like in which an inspection target is photographed by remotely controlling a drone, and defect inspection of the inspection target based on photographic information is performed quickly and at a low cost. Patent Document 1 describes that a server device is configured to receive photographic information and position information of the drone, analyze the photographic information, and identify a defect of the inspection target.

RELATED ART DOCUMENTS

Patent Documents

Patent Document 1: Japanese Patent Application Laid-Open Publication No. 2017-78575

SUMMARY OF THE INVENTION

Problems to be Solved by the Invention

Prior art examples such as Patent Document 1 fail to describe details of processing in which a computer identifies a defect, deterioration or the like using aerially-photographed images taken by an aircraft.

In order to find a deteriorated portion and the like from a large number of aerially-photographed images, the aircraft-utilizing deterioration diagnostic systems of prior art examples generally depend on a user (person performing the diagnosis) performing visual confirmation and diagnosis on the images. Thus, it would be difficult to perform operations efficiently, manpower and cost would increase, and it would also be difficult to promptly detect the deteriorated portion and the like.

In addition, in a case where the aircraft-utilizing deterioration diagnostic system of the prior art example compares current and previous aerially-photographed images to detect deterioration or the like, it is necessary to process a large number of aerially-photographed images using a computer. The process itself is difficult and requires a long processing time, whereby efficient diagnosis would be difficult. Depending on conditions at the time of photographing, contents of previous and current aerially-photographed images differ. The more they differ, the more difficult it would be to perform association and comparison processing between the previous and current images, and would also be difficult to improve accuracy of diagnostic processing.

An object of the present invention regarding the aircraft-utilizing deterioration diagnostic system is to provide a technique in which diagnostic efficiency and accuracy can be improved when previous and current aerially-photographed images are compared to diagnose a deteriorated state or the like of the target.

Means for Solving the Problems

A representative embodiment of the present invention includes an aircraft-utilizing deterioration diagnostic system that is characterized by having a configuration as described below.

The aircraft-utilizing deterioration diagnostic system according to one aspect of the present invention is an aircraft-utilizing deterioration diagnostic system configured to diagnose a state of a target including a deteriorated state by using photographing performed by an aircraft. The deterioration diagnostic system comprises: the aircraft configured to be navigated along a route around the target, and having a camera configured to photograph the target; and a computer system configured to control navigation of the aircraft and photographing by the camera. The computer system is further configured to navigate the aircraft along the route at a predetermined date and time; acquire data including an image group obtained by consecutively photographing the target; store the data in a DB; associate, for the same target, images including the same portion in current and previous images as comparison target images, based on diagnostic data including a diagnostic image group photographed at a current date and time, and based on reference data including a reference image group making reference to the DB and photographed at a previous date and time; compare current and previous images among the comparison target images, and determine a difference therebetween to detect a deteriorated portion including the deteriorated state from the current image; convert two-dimensional coordinates representing the deteriorated portion in the current image so as to be plotted on three-dimensional coordinates in an area of a three-dimensional model of the target; and generate a screen for visualizing diagnostic result information including the deteriorated portion in the area after the conversion, and display the screen for the user.

Effects of the Invention

According to the representative embodiment of the present invention related to a technique of the aircraft-utilizing deterioration diagnostic system, it is possible to increase diagnostic efficiency and accuracy when comparing previous and current aerially-photographed images to diagnose a deteriorated state of the target.

DESCRIPTION OF THE DRAWINGS

FIG. 4 is a drawing showing an overview of the embodiment;

FIG. 13 is a drawing showing a first configuration example of a screen for plotting and visualizing on a three-dimensional model of the embodiment;

FIG. 15 is a drawing showing a routing method according to a modification example of the embodiment;

FIG. 18 is a drawing showing a processing flow of a camera adjustment function according to a modification example of the embodiment;

FIG. 19 is a drawing showing a stepwise association method according to a modification example of the embodiment;

FIG. 22 is a drawing showing a different embodiment in which the targets are utility poles and electric wires;

FIG. 25 is an explanatory drawing showing association and comparison between previous and current image groups in a comparative example.

DETAILED DESCRIPTION

Hereinafter, details of an embodiment of the present invention will be described with reference to the drawings. Note that, in all of the drawings used to describe the embodiment, the same members are generally denoted by the same reference signs, and redundant descriptions thereof are omitted as appropriate.

[Problems and the Like]

Hereinafter, additional problems and the like of the aircraft-utilizing deterioration diagnostic system of the prior art examples will be described.

Figure 23:
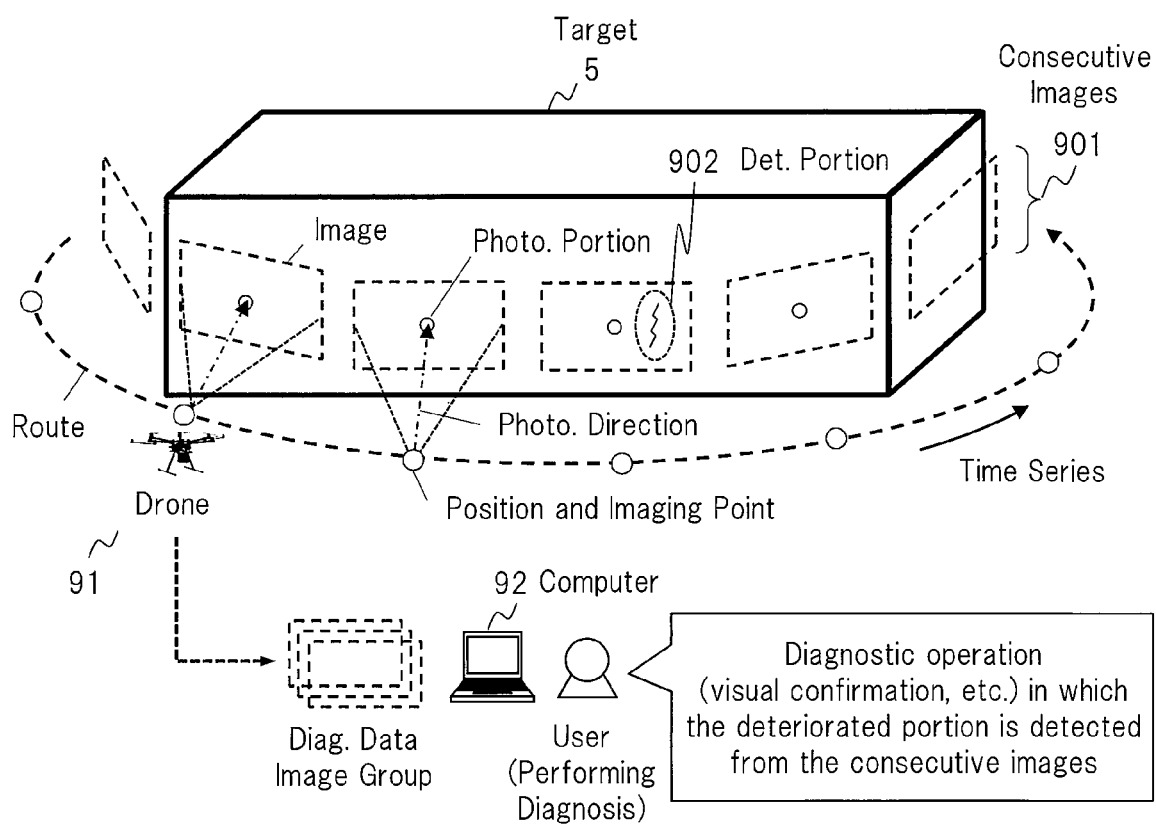
FIG. 23 is a drawing showing a case where diagnosis is performed in person as a comparative example of the aircraft-utilizing deterioration diagnostic system.

FIG. 23 is a first configuration example of an aircraft-utilizing deterioration diagnostic system according to an example comparative to the embodiment, and shows an example of aerially photographing a target 5 in a case where diagnosis of the deteriorated portion is performed by visual confirmation and the like in person. The target 5 is a predetermined structure such as a building or an infrastructure facility targeted for deterioration diagnosis. The present example shows a case where a diagnostic target region is a side wall of the target 5. In this method, an aircraft such as a drone 91 is autonomously navigated along a predetermined route in a zone around the target 5. The drone 91 is autonomously navigated along a set route based on controls from a control device such as a computer 92 via wireless communication. While the drone 91 is being navigated, a predetermined region (diagnostic target region) on a surface of the target 5 is consecutively photographed by a camera mounted on the drone 91. Predetermined photographing settings and photographing controls are set in the camera. The predetermined photographing settings are settings that include a photographing direction of the camera, photographing timing, photographing conditions and the like. The photographing direction of the camera is a direction from a position of the drone 91 or camera to the photographing portion. The photographing timing is a timing in which a still image is consecutively photographed at, for example, predetermined time intervals (or may be regarded as a photographing timing of a video taken at a predetermined framerate). The photographing conditions are conditions defined by set values of various known camera parameters (such as focal distance). The route and photographing settings are preset for photographing and diagnosing a predetermined region of the target 5.

By aerially photographing the target as described above, consecutive images 901 which are a plurality of consecutive images in a time-space series are obtained. The computer 92 is configured to acquire data (occasionally referred to as diagnostic data) including image groups constituted by the consecutive images 901 from the drone 91. The person performing the diagnosis who is the user performs diagnosis in which a deteriorated portion 902 or the like of the target 5 is diagnosed by performing visual confirmation on the image groups of diagnostic data. Finding a deteriorated portion from a large number of aerially-photographed images in person requires much manpower, time and cost. There is a desire to support or automate such diagnostic operations and reduce the cost. Thus, an aircraft-utilizing deterioration diagnostic system of a different comparative example as described below is provided.

Figure 24:
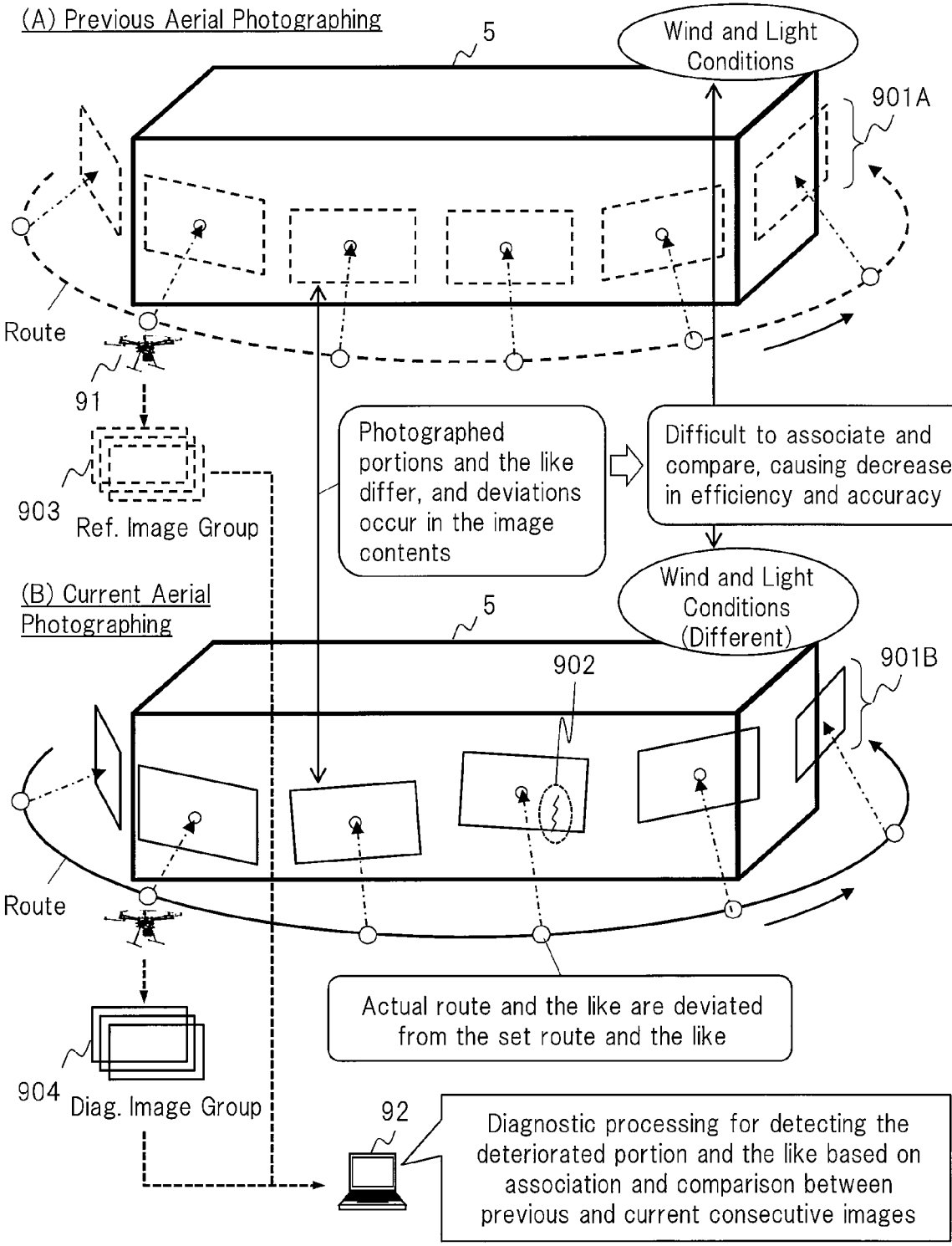
FIG. 24 is a drawing showing a case where diagnosis is performed by a computer as a comparative example of the aircraft-utilizing deterioration diagnostic system.

FIG. 24 is a second configuration example of an aircraft-utilizing deterioration diagnostic system of a comparative example, and shows an example of aerially photographing the target 5 in a case where the diagnostic operation is supported or automated by the computer 92. Part (A) of FIG. 24 shows conditions relating to the target 5 at the time of aerial photographing at the previous date and time, and part (B) shows conditions relating to the same target 5 at the time of aerial photographing at the current date and time. Routing of the drone 91 is set to be the same in both cases. In the method of the diagnostic system of this comparative example, the computer 92 performs diagnostic processing for automatically diagnosing and detecting a deteriorated portion and the like based on comparisons between the current aerially-photographed images and the previous aerially-photographed images, as described below.

The computer 92 acquires data (occasionally referred to as reference data) including image groups constituted by consecutive images 901A from the drone 91 for the date and time of the previous diagnosis and aerial photographing of part (A). The computer 92 stores the reference data, performs diagnostic processing, and stores diagnostic result information. Then, the computer 92 acquires data (diagnostic data) including an image group constituted by consecutive images 901B from the drone 91 for the date and time of the current diagnosis and aerial photographing of part (B). The computer 92 stores diagnostic data, performs diagnostic processing, and stores diagnostic result information.

The above-described aerial photographing and diagnosis of the target are performed for each predetermined date and time according to the target 5. For example, in order to diagnose a deteriorated state, aerial photographing or the like is performed according to a predetermined time schedule set yearly, monthly or the like. Thus, consecutive images, diagnostic result information and the like are obtained for each scheduled date and time, and are accumulated and stored in a DB or the like.

In addition to aerially-photographed image data and photographing setting information, the computer 92 acquires sensor data and the like of various sensors from the drone 91 at the time of aerial photographing. Examples of sensor data include position information based on GPS and the like, and information such as direction, speed and acceleration based on an electronic compass, a gyro sensor, an acceleration sensor and the like. These pieces of information are used at the time of the diagnosis.

At diagnostic processing of the target 5 performed at the predetermined diagnosis date and time, the computer 92 compares the image group (diagnostic image group) of current diagnostic data and the corresponding previous image group (reference image group) of reference data, and determines and detects a deteriorated portion and the like. At this time, the computer 92 performs association (occasionally referred to as matching) between images in the previous and current image groups, whose image contents include the same photographing portion and correspond to each other, as comparison target images. In other words, the computer 92 selects one or more images from potential previous and current image groups and performs association between the selected image pair as comparison target images. The computer 92 performs image analysis processing at an image level for the previous and current images among the comparison target images, compares the image contents, and determines the differences between the images. Thus, the computer 92 determines and detects a portion (collectively referred to as deteriorated portion) in, for example, a deteriorated, abnormal or changed state in a region on the surface of the target 5 from the aerially-photographed images.

In addition, the computer 92 determines, for example, a deterioration type or the like (such as cracks, rust, corrosion or peeling) and its degree of deterioration or the like by a predetermined processing. For example, the computer 92 detects a deteriorated portion having a degree of deterioration that is greater than a threshold value. The computer 92 stores diagnostic result information including the detected deteriorated portion and the like in the DB or the like and outputs it to the screen for the user. The user confirms the image and the like including the deteriorated portion via the screen.

In the diagnostic system of the comparative example, it is necessary to associate and compare a large number of previous and current aerially-photographed images. However, such processing including association and comparison have difficulties, raising problems in efficiency and accuracy of diagnostic processing. It is necessary for the computer 92 to select images associated with each other from each of the previous and current image groups. For this purpose, it is necessary to judge whether or not the image content includes the same portion and the like, and this judgement requires image analysis processing at the image level. It is necessary to perform such processing for a large number of previous and current images. Much time would be required to process a large amount of image data. As a result, diagnostic processing would require a long period of time, thereby reducing efficiency. It would also be difficult to obtain diagnostic results immediately after performing aerial photographing.

In addition, the route, photographing settings and the like are generally controlled such that aerial photographing is performed for the same region of the same target 5 at each diagnosis date and time. However, differences in conditions at that time cause deviations and the like between the image contents of the previous and current aerially-photographed images even if the images correspond to the same portion. The larger the difference, the more difficult it is to perform association and comparison between the images, making it difficult to improve diagnostic accuracy.

An example of differences in conditions at each date and time may include deviations in the actual navigation route of the drone 91 along the set route. For example, conditions such as wind speed differ according to season, weather and the like. Thus, deviations occur in the position, speed and orientation of the drone 91. This leads to differences in the aerially-photographed image contents. The drone 91 and camera may not be at the same position or the like even at the same point in time in which a predetermined length of time has passed from the start of navigation, whereby differences occur in the image contents. This cannot be solved by simply associating the images at the same point in time. In addition, at the time of actual photographing based on the photographing settings (such as photographing direction, photographing timing and photographing conditions) of the camera along with the set route, light conditions in the region of the target 5 vary according to sunlight, shade and the like. Thus, differences occur in the clearness or the like of the previous and current aerially-photographed image contents.

FIG. 25 is a drawing of a diagnostic system of the comparative example, and is an explanatory drawing showing difficulties concerning the association processing between the previous and current image groups and the comparison processing between the images. Part (A) of FIG. 25 shows an example of associating and comparing the image group of reference data at the previous date and time and the image group of diagnostic data at the current date and time. The horizontal axis represents consecutive images in time series. Each square represents one image. The stars represent an example of the same portion in the region of the target 5 for the sake of convenience. As described above, the association processing is an image-level matching process and is difficult to process. The computer 92 performs association between one or more images including the same portion in the previous and current image groups as comparison target images. The present example shows a case where association can be performed between three previous images and two current images. The computer 92 performs comparison processing for each of the previous and current images of the associated comparison target images. The comparison processing allows the deteriorated portion to be determined and detected based on differences between the previous and current images.

Parts (B) and (C) of FIG. 25 show an example of the comparison target images. Part (B) of FIG. 25 shows an example of contents of a single image taken at the previous date and time (such as on 2016/1/1) in a simplified manner. Part (C) of FIG. 25 shows an example of contents of a single image of the same portion of the same target 5 taken at the current date and time (such as on 2017/1/1). In both images, the position, photographing direction and the like of the drone 91 and the camera at the time of the aerial photographing differ, whereby image contents differ. A dot 905 represents the same location on a wall surface. In the current image, a deteriorated portion 906 (such as a crack) is surrounded by a dashed frame. In the previous image, a portion 907 corresponding to the deteriorated portion 906 is surrounded by a dashed frame. In the association and comparison processing, it is necessary to associate such images with each other and compare the image contents. In comparison processing, the deteriorated portion 906 can be detected based on the difference between the deteriorated portion 906 and the portion 907. The larger the difference between the previous and current image groups, the more difficult it is to perform association and comparison processing.

As compared to the diagnostic system of the comparative example, the diagnostic system of the embodiment has measures to simplify and improve efficiency of diagnostic processing including association and comparison between the previous and current images, thereby improving diagnostic accuracy.

Embodiment

Hereinafter, the aircraft-utilizing deterioration diagnostic system according to an embodiment of the present invention will be described with reference to FIGS. 1 to 14.

[Overview]

(1) The diagnostic system of the embodiment is an aircraft-utilizing deterioration diagnosis and deteriorated portion visualization system. The present diagnostic system is based on the method of the second configuration example of the comparative example. In other words, the present diagnostic system has a function (deterioration diagnostic function) for automatically determining and detecting a deteriorated portion by using the computer to perform diagnostic processing based on consecutive images of the previous and current target obtained by aerial photographing by the aircraft. The present diagnostic system stores diagnostic result information in the DB, and visualizes and displays the information on a screen for the person performing the diagnosis who is the user. In the present diagnostic system, a data processing method for diagnostic processing and a method of association and comparison processing between the images are devised. Thus, the user can efficiently perform diagnostic operations, thereby achieving a low-costing diagnosis.

The present diagnostic system is configured on the premise that the images (two-dimensional images) to be processed are consecutive images obtained by aerial photographing by the camera of the aircraft and that the images constitute an image group including a plurality of still images along a navigating and photographing time-space series. In the present diagnostic system, diagnostic processing for detecting a deteriorated portion is performed based on association and comparison between the diagnostic image group of current diagnostic data and the reference image group of the previous reference data. In the above-described diagnostic system of the comparative example, the image-level matching method is used at the time of diagnostic processing including association and comparison. In contrast, in the diagnostic system of the embodiment, a plane matching method is used at the time of diagnostic processing including association and comparison (see FIG. 7 and the like described below).

In the plane matching method, association and comparison is performed at a plane level detected from the image, instead of the image level, at the time of association and comparison processing. The present diagnostic system detects a plane from each of the previous and current images, performs association using the detected planes, and performs comparison between the previous and current planes of the associated images. The present diagnostic system determines and detects a deteriorated portion based on differences found by comparing the planes. By using the plane matching method, it is possible to simplify and improve efficiency of diagnostic processing including association and comparison between a large number of previous and current images, reduce calculation processing load and detect a deteriorated portion more quickly.

(2) In addition, the present diagnostic system has a function for providing a screen visualized for the user such that the deteriorated portion in the image detected by diagnostic processing is plotted in an area including a target three-dimensional model. At this time, the present diagnostic system performs processing such that two-dimensional coordinate information representing the deteriorated portion in the image is converted into three-dimensional coordinate information on the target three-dimensional model (association and conversion from two-dimensional to three-dimensional coordinates) (see FIG. 9 and the like described below). This conversion uses the known SFM (Structure for motion) processing and the like. At the time of the conversion, the present diagnostic system determines the three-dimensional coordinates (X,Y,Z) on the target three-dimensional model from the two-dimensional coordinates (x,y) representing the deteriorated portion in each of at least two consecutive images by using a perspective conversion matrix. The perspective conversion matrix is calculated beforehand by using the SFM processing or the like.

In the diagnostic system of the comparative example, the person performing the diagnosis or the computer detects the deteriorated portion from the aerially-photographed images. However, there may be a case where, for example, the location of the deteriorated portion in the area including the target is unclear from the images including the deteriorated portion. In contrast, in the present diagnostic system, the user can easily recognize the location of the deteriorated portion in the area including the target via the screen. The user can efficiently and instinctively find the deteriorated portion and the like.

(3) Further, in the present diagnostic system, various functions in addition to the diagnostic function of the plane matching method and the deteriorated portion visualization function can be provided as a modification example which can also be used in combination thereof. Examples of methods of the additional functions include a routing method, a camera adjustment method, a stepwise association method and a partial SFM processing method described below. The user can use the additional functions based on user settings of the present diagnostic system. Thus, it is possible to further reduce calculation time and improve diagnostic accuracy of diagnostic processing of basic functions.

[Aircraft-Utilizing Deterioration Diagnostic System (1)]

Figure 1:
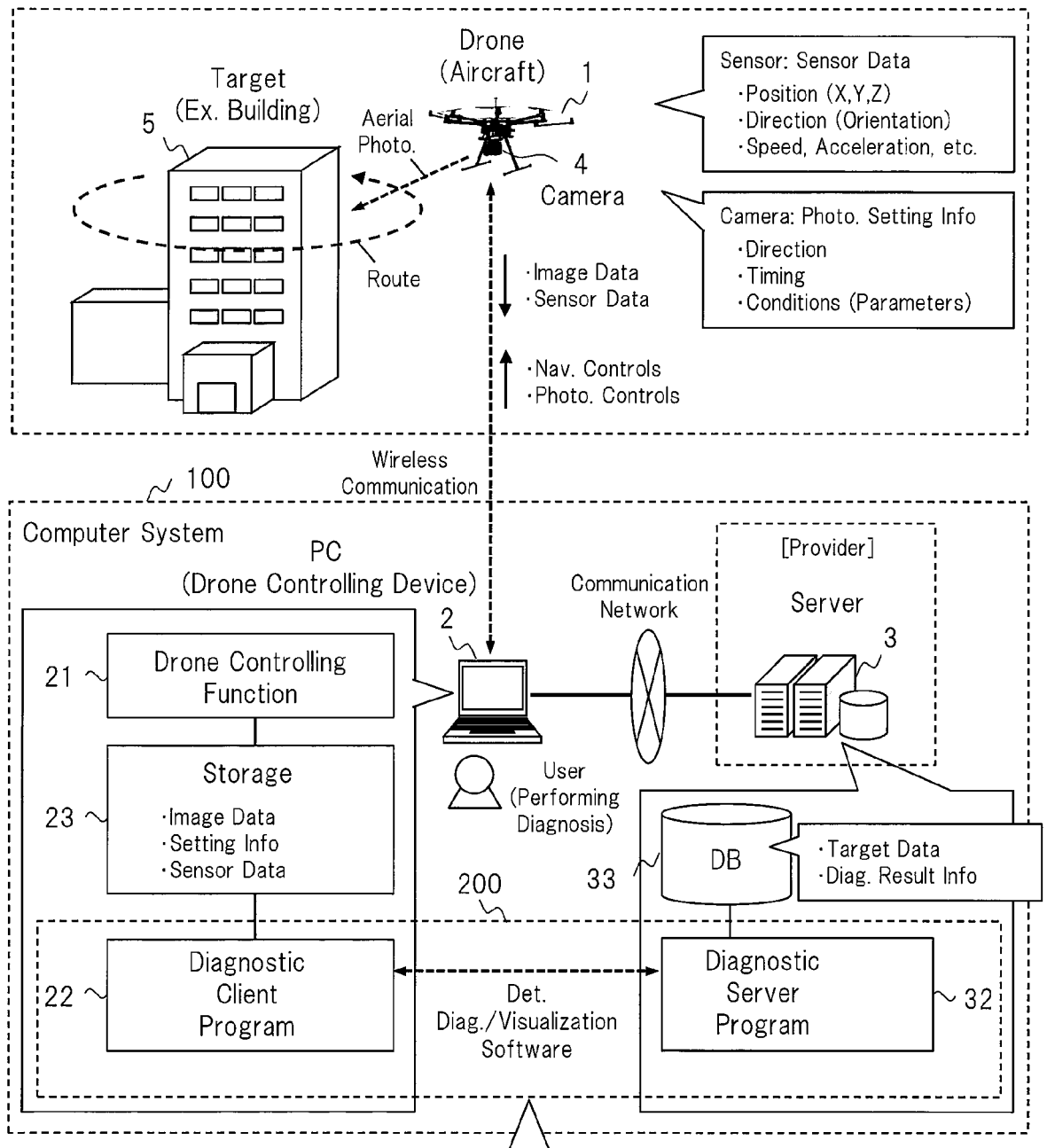
FIG. 1 is a drawing showing a configuration of an aircraft-utilizing deterioration diagnostic system according to an embodiment of the present invention.

FIG. 1 shows an entire configuration of the diagnostic system which is the aircraft-utilizing deterioration diagnostic system of the embodiment. The diagnostic system comprises an aircraft which is a drone 1 and a computer system 100, and the drone 1 and the computer system 100 are connected to each other via wireless communication. The computer system 100 has, for example, a PC 2 and a server 3, and PC 2 and the server 3 are connected to each other via a communication network. The PC 2 is a drone controlling device and is a client terminal device that is used by an individual user (person performing the diagnosis). The server 3 is a server device in, for example, a cloud computing system, a data center or the like of a provider, and is a calculation processing device that cooperates with the PC 2.

The target 5 is a diagnostic target structure and is an object for a camera 4. Examples of the target 5 include buildings and infrastructure facilities. Examples of a building include general buildings, houses and public buildings. Examples of an infrastructure facility include power facilities (such as thermal power plants, wind power plants and hydroelectric power plants), public transportation facilities, communication facilities and bridges. The predetermined region of the surface of the target 5 is the diagnostic target region and the photographing target region. The navigation route and date and time of the drone 1, photographing setting information of the camera 4 and the like are set beforehand such that the predetermined region can be aerially photographed.

The drone 1 is an aircraft that performs autonomous navigation based on remote controls from the PC 2 via wireless communication. Note that the modification example provides a configuration in which the user is allowed to control navigation of the drone 1 via the PC 2. The drone 1 is autonomously navigated along the set route in the area around the predetermined target. The drone 1 is equipped with the camera 4 and various sensors. The drone 1 aerially photographs the target 5 by using the camera 4 while being navigated along the route. The drone 1 sends the photographed image data, sensor data and the like to the PC 2 via wireless communication.

For the known sensor group of the drone 1, position, direction (orientation), speed, acceleration and the like of the drone 1 and camera 4 can be detected as sensor data. The position includes the three-dimensional coordinates (X,Y,Z). The position can be obtained as latitude, longitude and altitude (height from ground surface) based on, for example, GPS, an altitude sensor, or other positioning, navigation and timing systems. When using GPS, it is used on the premise that a sufficient positioning accuracy can be obtained.

For the camera 4, examples of photographing setting information include photographing direction, photographing timing, photographing conditions (camera parameters) and the like. The photographing direction is a direction in which the drone 1 and the camera 4 are oriented toward the photographing portion of the target 5. The photographing timing is a timing for imaging a plurality of consecutive images (still images). The photographing conditions are defined by set values of known camera parameters such as focal distance and angle of view of the lens.

The PC 2 performs navigation controls of the drone 1 and photographing controls of the camera 4 via wireless communication. The PC 2 sends the known navigation control parameters, photographing setting information and the like to the drone 1. The person performing the diagnosis who is the user operates the PC 2 to use the present diagnostic system. The user can input commands and user settings for the present diagnostic system, and confirm setting status, diagnostic result information and the like via the screen of the PC 2. Note that a plurality of PCs 2 for a plurality of users may be similarly connected to the server 3.

The PC 2 has a drone controlling function 21, a diagnostic client program 22, a storage 23 and the like. The drone controlling function 21 is a known function for controlling navigation of the drone 1 and photographing by the camera 4. The diagnostic client program 22 is a client program in an aircraft-utilizing deterioration diagnostic and deteriorated portion visualization software 200. The diagnostic client program 22 of the PC 2 cooperates with a diagnostic server program 32 of the server 3 via client server communication to perform processing. The diagnostic client program 22 controls the drone controlling function 21. The diagnostic client program 22 is particularly responsible for cooperating with the drone 1 and screen displaying processing.

Various data/information for processing used by the diagnostic client program 22 are stored in the storage 23 of the PC 2. Photographed image data acquired from the drone 1, sensor data, photographing setting information set for the drone 1 and the like are stored in the storage 23. Pieces of data acquired from the server 3 are also stored in the storage 23.

The server 3 has the diagnostic server program 32, a DB 33 and the like. The diagnostic server program 32 is a server program in the aircraft-utilizing deterioration diagnostic and deteriorated portion visualization software 200. The diagnostic server program 32 is particularly responsible for performing processing with a high calculation processing load, such as diagnostic processing. The diagnostic server program 32 executes a predetermined processing in response to a request from the diagnostic client program 22 and responds with the processing result information.

Various data for processing used by the diagnostic server program 32 and the diagnostic client program 22 are stored in the DB 33 of the server 3. The DB 33 may be achieved by a DB server or the like. In addition to pieces of data acquired from the PC 2, target data, diagnostic result information and the like are stored in the DB 33. Target data is data including basic information of the target 5, target three-dimensional model data and the like. The target three-dimensional model data is data in any format, and may be data created by, for example, an existing CAD system or the like. Alternatively, the target three-dimensional model data may be data obtained as a result of restoring a three-dimensional structure using the known SFM processing based on the aerially-photographed images. The diagnostic result information is a diagnostic processing result of the aircraft-utilizing deterioration diagnostic and deteriorated portion visualization software 200, and contains the image including the deteriorated portion, information for plotting the deteriorated portion on the target three-dimensional model, and the like.

The aircraft-utilizing deterioration diagnostic and deteriorated portion visualization software 200 achieves functions including the deterioration diagnostic function and the deteriorated portion visualization function. The deterioration diagnostic function is a function for detecting a deteriorated portion of the target 5 by performing diagnostic processing based on association and comparison of the previous and current aerially-photographed images. Diagnostic processing particularly uses the plane matching method. The deteriorated portion visualization function is a function for providing a screen visualized such that the deteriorated portion in the image detected by the deterioration diagnostic function is plotted on the target three-dimensional model.

The implementation configuration of the computer system 100 is not limited to the above-described configuration, and may have other configurations. For example, the PC 2 and the server 3 may be integrated as a single device, or may be separated into a plurality of devices for each function. The drone controlling device and the PC 2 may be separated from each other. A known drone or a UAV may be applied for the aircraft. However, an exclusive aircraft equipped with specific additional functions for the present diagnostic system may be used.

[Aircraft-Utilizing Deterioration Diagnostic System (2)]

Figure 2:
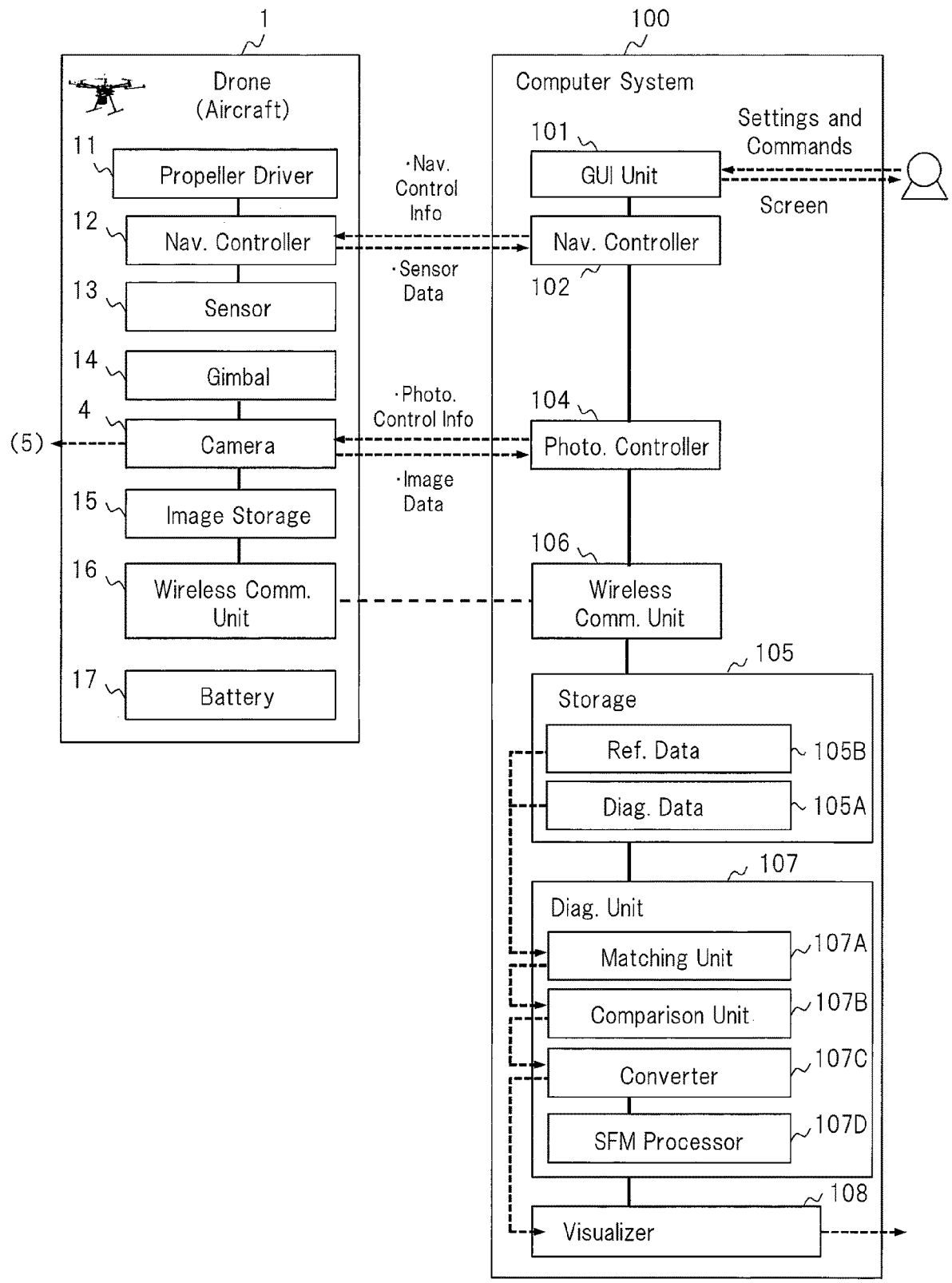
FIG. 2 is a drawing showing configuration examples of a drone and a computer system of the embodiment.

FIG. 2 shows schematic functional block configurations of the drone 1 and computer system 100 of the present diagnostic system.

The drone 1 has a propeller driver 11, a navigation controller 12, a sensor 13, a gimbal 14, the camera 4, an image storage 15, a wireless communication unit 16, a battery 17 and the like. The propeller driver 11 drives a plurality of propellers. The navigation controller 12 controls navigation of the drone 1 according to navigation control information from a navigation controller 102 of the PC 2. Thus, the navigation controller 12 drives and controls the propeller driver 11 while using detection information from the sensor 13. The sensor 13 is a group of sensors including the known GPS receiver, electronic compass, gyro sensor, acceleration sensor and the like, and outputs predetermined sensor data. The gimbal 14 is a known mechanism for holding the camera 4, and automatically maintains the camera 4 so as to be in a constant state in which no blurs occur during navigation. The camera 4 aerially photographs the target 5 according to photographing control information and photographing setting information from a photographing controller 104 of the PC 2 and outputs photographed image data. The image storage 15 stores photographed image data and the like. The wireless communication unit 16 includes a wireless communication interface device, and performs wireless communication with the computer system 100 via a predetermined wireless communication interface. The battery 17 supplies power to each unit.

The computer system 100 has a GUI unit 101, the navigation controller 102, the photographing controller 104, a storage 105, a wireless communication unit 106, a diagnostic unit 107, and a visualizer 108.

The GUI unit 101 configures the screen serving as a GUI (graphical user interface) for the user and displays it on the display. The user can input user settings and commands, and confirm setting status, diagnostic result information and the like via the screen. In the user settings, it is possible to set whether or not to use each function provided by the present diagnostic system, and set threshold values and the like for controlling each function. In routing settings, it is possible to set a basic navigation route (including start/finish points) of the drone 1, a schedule including aerial photographing and diagnosis dates and times, and the like. In photographing settings, it is possible to set basic camera parameters and the like of the camera 4.

The navigation controller 102 controls navigation of the drone 1 based on routing settings and the like. The navigation controller 102 sends navigation control information to the drone 1 via wireless communication, and receives sensor data and the like representing a navigation state of the drone 1.

The photographing controller 104 controls photographing by the camera 4 based on photographing setting information. The photographing controller 104 sends photographing control information based on photographing setting information to the drone 1 via wireless communication, and receives photographed image data and the like from the drone 1.

The storage 105 includes a diagnostic data storage 105A, a reference data storage 105B. The diagnostic data storage 105A stores the diagnostic image group and the like obtained at the current aerial photographing. The reference data storage 105B stores the reference image group obtained at the previous aerial photographing. Information of image data is managed in the storage 105 in a state where the photographing date and time, sensor data, photographing setting information and the like are associated with one another. User setting information, target data and diagnostic result information of FIG. 1 and the like are also stored in the storage 105.

The wireless communication unit 106 includes a wireless communication interface device, and performs wireless communication with the drone 1 via a predetermined wireless communication interface.

The diagnostic unit 107 performs diagnostic processing using current diagnostic data and previous reference data as input, and outputs diagnostic result information. The diagnostic unit 107 includes a matching unit 107A, a comparison unit 107B, a converter 107C, and an SFM processor 107D. The matching unit 107A performs association processing between the diagnostic image group of diagnostic data and the reference image group of reference data. The matching unit 107A particularly performs association processing using the plane matching method. The comparison unit 107B compares the previous and current images of the associated comparison target images and determines a difference therebetween to detect the portion (deteriorated portion) in, for example, a deteriorated, abnormal or changed state. The comparison unit 107B particularly performs comparison processing using the plane matching method. In addition, the comparison unit 107B determines the deterioration type and the like and degree of deterioration and the like.

The converter 107C performs coordinate conversion processing in which two-dimensional coordinate information representing the deteriorated portion is converted into three-dimensional coordinate information on the target three-dimensional model for plotting the deteriorated portion detected from the image on the target three-dimensional model. At the time of conversion, the converter 107C uses SFM processing of the SFM processor 107D.

The SFM processor 107D performs known SFM processing. The SFM processor 107D performs SFM processing on a plurality of input images, restores the three-dimensional structure, and outputs result information. In SFM processing, the three-dimensional structure (represented by three-dimensional coordinates of a plurality of minutiae) of the surface of the target 5 and a viewing position (position of camera 4) are restored based on two-dimensional coordinates of minutiae in at least two consecutive images.

The visualizer 108 performs processing for visualizing the deteriorated portion and the like on the screen based on diagnostic result information of the diagnostic unit 107. The visualizer 108 provides a screen in which the deteriorated portion is plotted on the target three-dimensional model. The visualizer 108 displays an image and information of the deteriorated portion in response to input operations performed on the screen by the user.

[Aircraft-Utilizing Deterioration Diagnostic System (3)]

Figure 3:
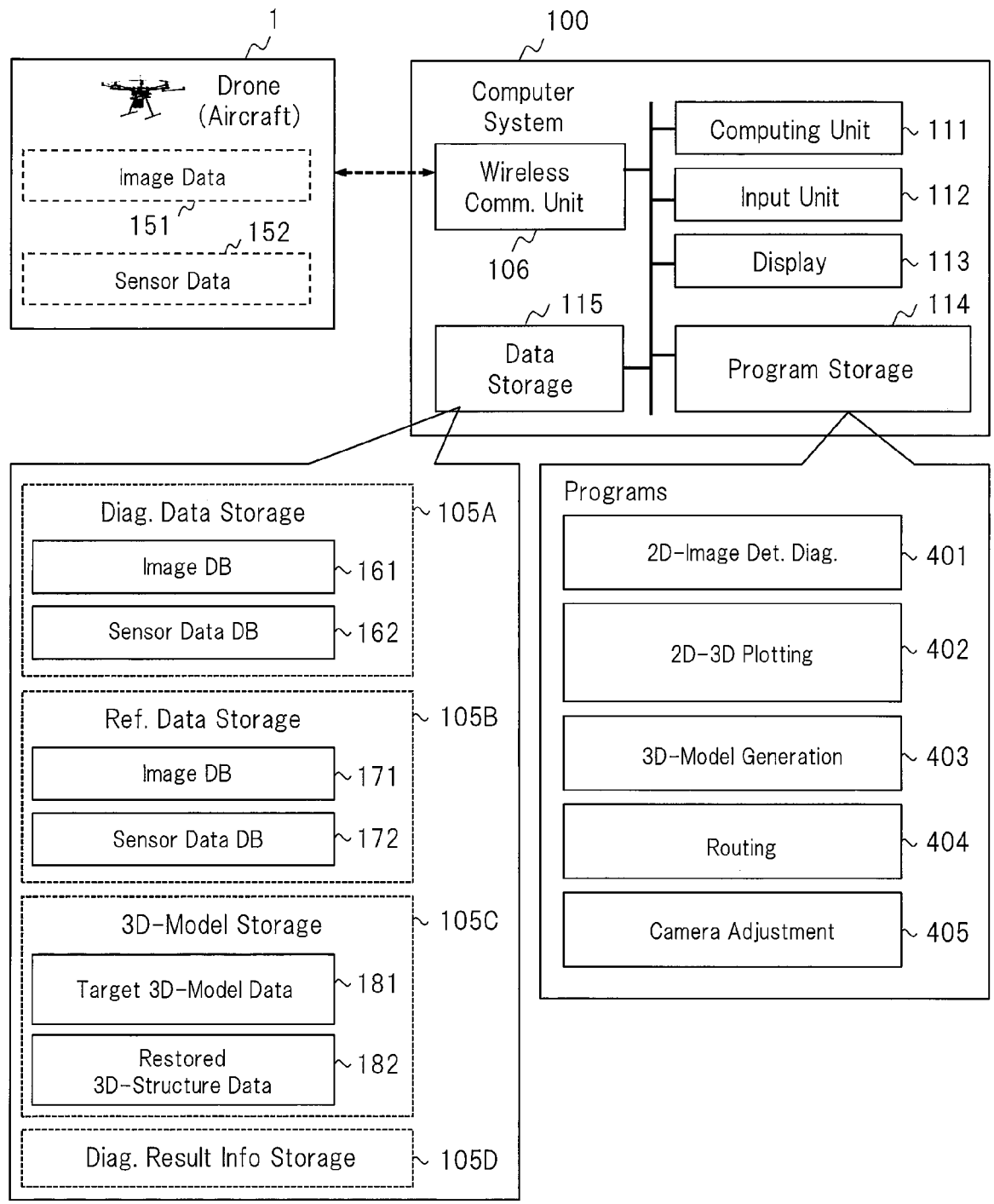
FIG. 3 is a drawing showing a configuration example of the computer system of the embodiment.

FIG. 3 shows configuration examples of hardware, programs and data in the computer system 100 of the present diagnostic system. The computer system 100 has a computing unit 111, an input unit 112, a display 113, the wireless communication unit 106, a program storage 114, a data storage 115 and the like, which are connected by a bus or the like.

The computing unit 111 is constituted by a CPU, a ROM, a RAM or the like, and achieves processors such as the diagnostic unit 107 by performing processing according to programs read from the program storage 114. The input unit 112 includes input devices such as a keyboard or a mouse, and accepts input by the user. The display 113 displays the screen for the user. Other output devices such as a printer may also be provided.

The program storage 114 is constituted by a nonvolatile memory or the like, and stores programs for achieving functions of the diagnostic system. Examples of a program include a two-dimensional image deterioration diagnostic program 401, a two-to-three-dimensional plotting program 402, a three-dimensional model generation program 403, a routing program 404, a camera adjustment program 405 and the like.

The two-dimensional image deterioration diagnostic program 401 is a program for achieving diagnostic processing including association and comparison (matching unit 107A and comparison unit 107B of FIG. 2) between previous and current image groups, and includes a program for achieving processing of the plane matching method.

The two-to-three-dimensional plotting program 402 is a program that achieves coordinate conversion processing (converter 107C of FIG. 2) and the like for plotting the deteriorated portion detected from the image onto the target three-dimensional model. This program includes a program for processing a method of selecting two-dimensional coordinates when converting the two-dimensional coordinates representing the deteriorated portion into the three-dimensional coordinates of the target.

The three-dimensional model generation program 403 is a program for achieving SFM processing (SFM processor 107D of FIG. 2) and the like for restoring the three-dimensional structure on the target three-dimensional model from the consecutive images. Note that the three-dimensional model generation program 403 (the SFM processor 107D) may use an external program. For example, an external server for SFM processing may be provided separately from the server 3, and the server 3 may communicate and cooperate with the external server to achieve this function.

The routing program 404 is a program for achieving processing for setting the route and the like for the drone 1. There is no specific limitation on the method of setting the basic route. The method may be such that the route is set based on data obtained by actually maneuvering the drone 1, or may be such that the route is manually set based on the target three-dimensional model on the settings screen, without maneuvering the drone 1.

The camera adjustment program 405 is a program for achieving processing of setting and adjusting photographing setting information including camera parameters of the camera 4.

The computer system 100 acquires photographed image data 151 and sensor data 152 (position, direction, speed, acceleration and the like) from the drone 1 via wireless communication and stores the data in the data storage 115.

The data storage 115 can be constituted by a buffer memory, storage device, a DB server or the like, and stores various data/information used for processing. The storage and DB of various data/information may be constituted by separate storage devices, DB servers or the like. The data storage 115 includes the diagnostic data storage 105A, the reference data storage 105B, a three-dimensional model storage 105C and a diagnostic result information storage 105D. The diagnostic data storage 105A includes a diagnostic image DB 161 and a diagnostic sensor data DB 162. Image groups (diagnostic image groups) of the diagnostic target are organized and stored in time series in the diagnostic image DB 161. Sensor data groups associated with the diagnostic image groups are organized and stored in time series in the diagnostic sensor data DB 162. The reference data storage 105B includes a reference image DB 171 and a reference sensor data DB 172. Image groups (reference image groups) to be referred to as comparison target images are organized and stored in time series in the reference image DB 171. Sensor data groups associated with the reference image groups are organized and stored in time series in the reference sensor data DB 172.

Note that the latest diagnostic data is stored in the diagnostic data storage 105A in response to diagnostic data generated at the latest date and time. At this time, the stored diagnostic data generated at the previous date and time is sequentially moved to the reference data storage 105B and becomes reference data.

Target three-dimensional model data 181, restored three-dimensional structure data 182 and the like are stored in the three-dimensional model storage 105C. The target three-dimensional model data 181 includes current and previous three-dimensional model data of the target 5, and can be CAD data or the like. The restored three-dimensional structure data 182 includes three-dimensional structure data restored by SFM processing.

Diagnostic result information is stored in the diagnostic result information storage 105D. Diagnostic result information includes two-dimensional coordinate information representing the detected deteriorated portion, corresponding aerially-photographed images, and three-dimensional coordinate information representing the deteriorated portion plotted on the target three-dimensional model.

At the time of diagnosis, the computer system 100 (PC 2 or server 3) allows diagnostic data such as diagnostic image groups and sensor data acquired from the drone 1 to be temporarily stored in the diagnostic data storage 105A. The computer system 100 accordingly reads the necessary diagnostic data from the diagnostic data storage 105A into a processing memory (memory of computing unit 111 or other memory). In addition, the computer system 100 accordingly reads the necessary data reference data such as reference image groups and sensor data of the same target 5 from the reference data storage 105B into the memory. In addition, the computer system 100 reads target three-dimensional model data 181 from the three-dimensional model storage 105C to the memory. The computer system 100 performs diagnostic processing and the like using the data read into the memory.

At the time of diagnostic processing, the computer system 100 restored the three-dimensional structure of the target including the deteriorated portion based on the diagnostic image group by conversion processing using SFM processing, and stores it as restored three-dimensional structure data 182. The computer system 100 uses the restored three-dimensional structure data 182 to plot the deteriorated portion on the target three-dimensional model.

The following describes a configuration example of processing assigned to the PC 2 and the server 3. The PC 2 acquires photographed image data 151 and sensor data 152 from the drone 1, and sends a processing request along with the data to the server 3. The server 3, performs diagnostic processing in the diagnostic unit 107 of FIG. 2 in response to the processing request, detects the deteriorated portion, and performs conversion such that the deteriorated portion is plotted on the target three-dimensional model. The visualizer 108 generates screen data for the screen visualizing the deteriorated portion on the target three-dimensional model. The server 3 sends screen data including such diagnostic result information to the PC 2. The PC 2 displays the screen based on the screen data.

[Aircraft-Utilizing Deterioration Diagnostic System (4)]

As an overview of the embodiment, FIG. 4 shows aerial photographing around the target 5, and association and comparison processing between previous and current aerially-photographed images.

Part (A) of FIG. 4 shows the route around the target 5 and consecutive images 401 taken at the time of the previous aerial photographing (such as in 2016/1). In the present example, the side wall and the like of the building are set as the diagnostic target region of the target 5. In the present example, aerial photographing of the side wall and the like is performed in a direction such that the drone 1 is viewing the target 5 obliquely downward from above. Note that the drone 1 is navigated along the route in a flyable area satisfying predetermined rules. The wall surface of the building generally has a predetermined structure or wall design (such as designs according to window or pillars positions). Each dot on the route represents position and imaging point of the drone 1 and the camera 4. Note that the position of the drone 1 and the position of the camera 4 are roughly the same. A dot-and-dash arrow extending from each dot represents the photographing direction of the camera 4. The distal end of the dot-and-dash represents the photographing portion and is a center point of the image. This aerial photographing allows the consecutive images 401 to be obtained from the drone 1 and be stored as reference image groups of reference data.

Likewise, part (B) of FIG. 4 shows the route around the same target 5, consecutive images 402 and the like at the time of the current aerial photographing (such as in 2017/1). The set routes are the same in both part (A) and part (B). However, the actual navigation trajectory of the drone 1 is deviated from the set route. The drawing shows an example in which a portion of the target 5 has a deteriorated portion 403. This aerial photographing allows the consecutive images 402 to be obtained from the drone 1 and be stored as diagnostic image groups of diagnostic data. Since wind and light conditions differ according to the date and time of aerial photographing, image contents of each of the consecutive images also differ.

The computer (PC 2 and server 3) of the computer system 100 detects the deteriorated portion by inputting the diagnostic image group of current diagnostic data and the reference image group of previous reference data and performing association and comparison. At this time, the computer performs association and comparison between the planes in each image using the plane matching method. Thus, it is possible to simplify and improve efficiency of processing association and comparison. The computer can detect, for example, the deteriorated portion 403 as a result of diagnostic processing. The computer provides a screen visualized such that the detected deteriorated portion 403 is plotted on three-dimensional model of the target 5.

In addition, in the present diagnostic system, the routing method, the camera adjustment method, the stepwise association method, the partial SFM processing method, which will be described below, and the like can be used together as additional functions. By combining the additional functions, it is possible to further improve efficiency.

[DB Data/Information]

Examples of various data/information such as reference data and diagnostic data acquired and stored in the DB 33 and the like of the computer system 100 include the following.

(a) Photographing time information: Date and time of aerial photographing and information on each imaging point in time series. For example, year, month, day, minutes, and seconds.

(b) Position information: Position information of the drone 1 and camera 4. Includes latitude, longitude and altitude (height from ground surface) measured, for example, based on GPS. The position can be represented by the three-dimensional coordinates (X,Y,Z) in a three-dimensional area including the target three-dimensional model.

Another sensor may be used for the altitude (height sensor). A positioning, navigation and timing system other than GPS may also be used.

(c) Photographing direction: The photographing direction of the camera 4. The direction from the position of the drone 1 and camera 4 toward the photographing portion. The photographing direction is controllable by controlling the gimbal 14 of the drone 1.

(d) Camera parameters (Photographing conditions): Various parameters that can be set as basic functions of the camera 4. For example, set values for the aperture, lens, shutter, flash and the like. Also, focal distance, angle of view and the like.

(e) Deteriorated portion information and deterioration probability estimate: Deteriorated portion information includes two-dimensional coordinate information of the deteriorated portion in the image, and three-dimensional coordinate information on the target three-dimensional model. Deteriorated portion information may be information on one or more minutiae (changed points) representing the deteriorated portion, and a two-dimensional region constituted by a group of minutiae. The deteriorated portion information includes a deterioration probability estimate. In diagnostic processing, probability of occurrence of deterioration at the location of the three-dimensional coordinates of the deteriorated portion is estimated and is expressed in percentages. In addition, deteriorated portion information may include information such as the deterioration type, degree of deterioration and the like.

[Processing Flow]

Figure 5:
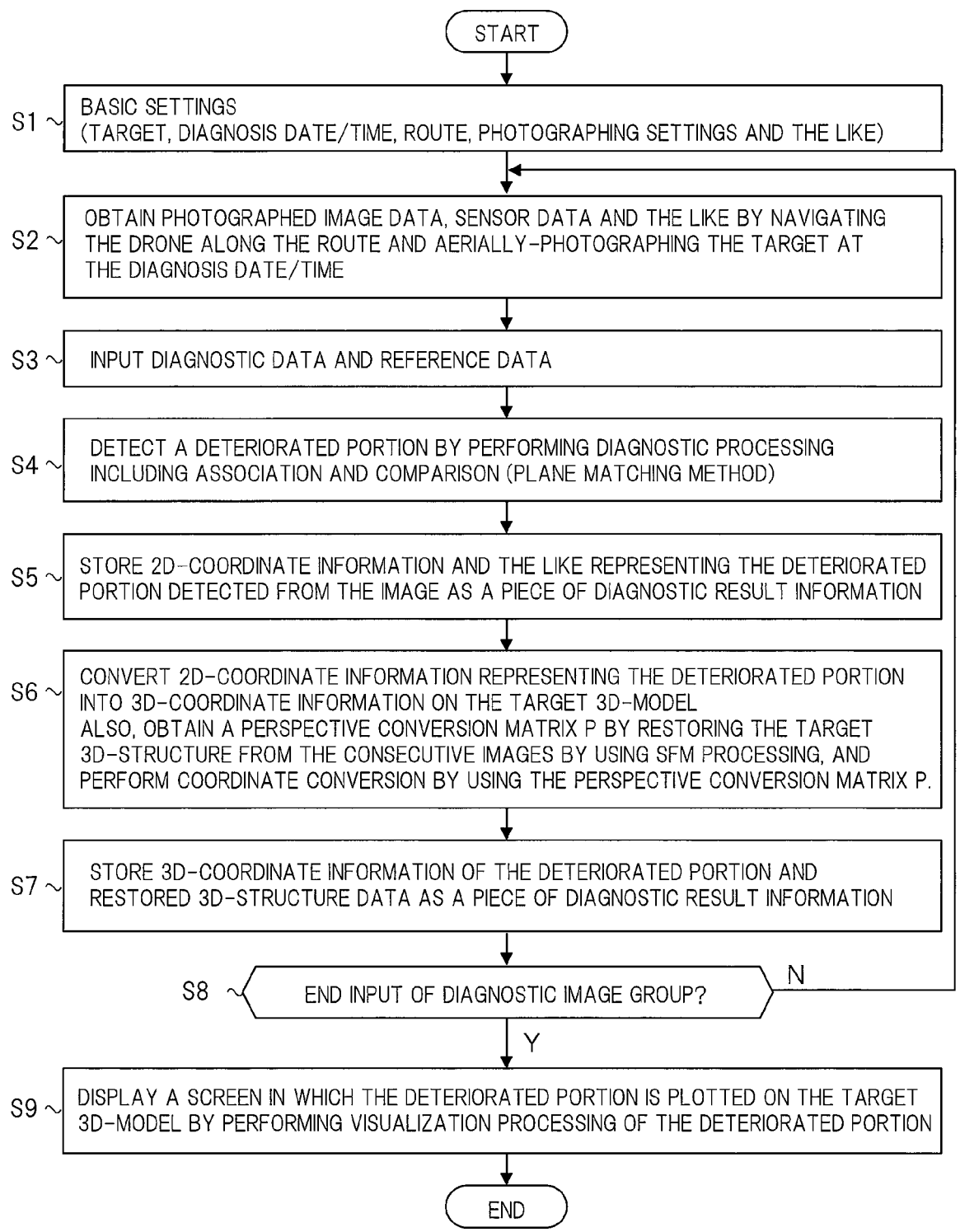
FIG. 5 is a flowchart showing a basic processing of the embodiment.

FIG. 5 shows a basic processing flow of the computer (PC 2 and server 3) of the computer system 100 of the present diagnostic system. FIG. 5 includes steps S1 to S9. Hereinafter, the process will be described in the order of the steps. Note that the flow is a flow of a method in which diagnostic processing and the like are performed are performed in real-time along with navigation of the drone 1 and aerial photographing. The method is not limited to this, and may be a method in which photographed image data and the like are acquired and diagnostic processing is performed after performing navigation of the drone 1 and aerial photographing.

(S1) The computer displays the settings screen based on input operations of the user and performs basic settings. Examples of basic settings include the diagnostic target region of the target 5 (target three-dimensional model data), diagnosis date and time, route, photographing setting information and the like.

(S2) At the diagnosis date and time, the drone 1 is autonomously navigated along the route and the region of the target 5 is aerially photographed by the camera 4 based on controls from the PC 2. The drone 1 sends photographed image data and sensor data acquired at this time to the PC 2. The PC 2 acquires the data as diagnostic data.

(S3) The diagnostic unit 107 of the computer of FIG. 2 inputs diagnostic data and inputs making reference to reference data of the same target 5 as the diagnostic data. Specifically, for example, the PC 2 sends diagnostic data (diagnostic image group and diagnostic sensor data) to the server 3. The server 3 inputs the diagnostic data and reads previous reference data (reference image group and reference sensor data) of the same target 5 from the DB 33. At this time, reference data taken at a diagnosis date and time prior to the current diagnosis date and time by a predetermined amount of time is made reference as a potential. The predetermined amount of time is set beforehand together with the diagnosis date and time according to the target 5 and the like, and may be selectively set to, for example, one year ago, six months ago, one month ago, one week ago or the like.

(S4) The diagnostic unit 107 performs diagnostic processing based on the input diagnostic data and reference data, and determines and detects the deteriorated portion. The matching unit 107A performs association processing between the diagnostic image group and the reference image group by the plane matching method, and obtains the comparison target images. At this time, the matching unit 107A detects planes from the images and performs association using the detected planes. The comparison unit 107B compares image contents in the previous and current images of the comparison target images, and determines and detects the deteriorated portion in the deteriorated state or the like. At this time, the comparison unit 107B compares the planes detected from the images. In addition, the comparison unit 107B may also determine the deterioration type, degree of deterioration and the like.

(S5) If the diagnostic unit 107 detects a deteriorated portion form the two-dimensional image of the diagnostic data, the diagnostic unit 107 stores two-dimensional coordinate information representing the deteriorated portion as a piece of diagnostic result information.

(S6) The diagnostic unit 107 performs processing in which the deteriorated portion is plotted on the target three-dimensional model. For this processing, the converter 107C performs coordinate conversion processing in which two-dimensional coordinate information representing the deteriorated portion is converted into three-dimensional coordinate information on the target three-dimensional model. At this time, the diagnostic unit 107 allows SFM processing to be performed by using the SFM processor 107D. The SFM processor 107D performs SFM processing on the consecutive images beforehand and restores the three-dimensional structure to obtain a perspective conversion matrix P. The converter 107C converts the two-dimensional coordinates into three-dimensional coordinates representing the location of the deteriorated portion from at least two consecutive images among the diagnostic image group including the deteriorated portion based on the perspective conversion matrix P.

(S7) The diagnostic unit 107 stores the three-dimensional coordinates of deteriorated portion information, restored three-dimensional structure data 182 and the like obtained in step S6 as pieces of diagnostic result information.

(S8) The diagnostic unit 107 confirms whether or not input of the diagnostic image group of diagnostic data is finished (whether or not there are additional consecutive input images). If finished (Y), the process continues to step S9, and if not (N), the process returns to step S2 and the steps are repeated.

(S9) The visualizer 108 performs deteriorated portion visualization processing. The visualizer 108 configures screen data (such as webpage data) in which the deteriorated portion is plotted on the target three-dimensional model using diagnostic result information. The server 3 sends the screen data to the PC 2. The PC 2 displays the screen on the display based on the screen data. The user can confirm the deteriorated portion and the like on the target three-dimensional model.

[Diagnostic Processing: Plane Matching Method (1)]

Figure 6:
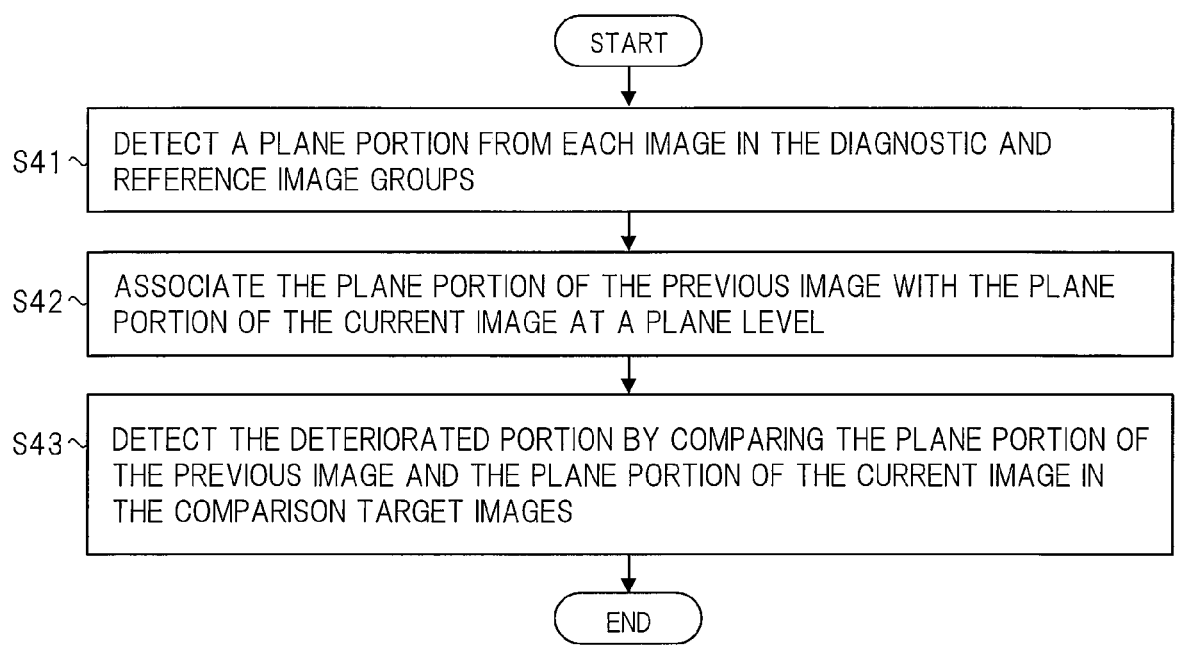
FIG. 6 is a flowchart showing an overview of diagnostic processing in a plane matching method of the embodiment.

FIG. 6 shows the processing flow including the plane matching processing performed during diagnostic processing (S4) of the diagnostic unit 107. FIG. 6 includes steps S41 to S43.

Figure 7:
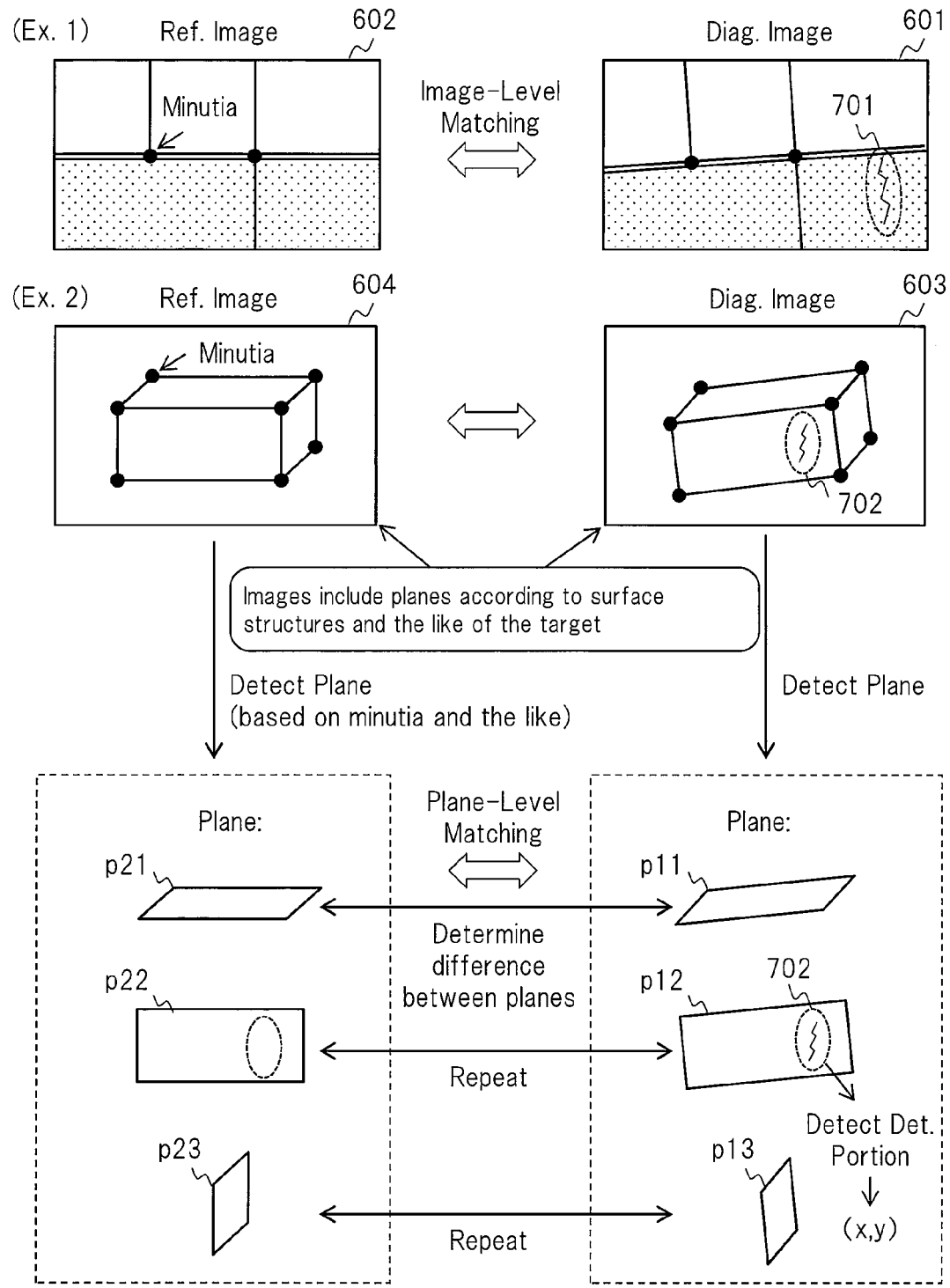
FIG. 7 is a drawing showing diagnostic processing in the plane matching method of the embodiment.

(S41) The diagnostic unit 107 detects a plane portion from within each image among the input diagnostic image group and reference image group (FIG. 7 described below). The plane detection processing can be achieved based on processing for detecting a minutia or an edge line from within the image. Continuous regions having color for each pixel in the image and roughly having the same color can be detected as a plane (plane portion).

(S42) The matching unit 107A of the diagnostic unit 107 performs association between the diagnostic image group and the reference image group by using the detected plane portion to obtain comparison target images. At this time, it is possible to compare, for example, the plane in each image and associate the images having roughly the same plane.

(S43) The comparison unit 107B of the diagnostic unit 107 performs comparison at the plane level between the plane of the previous image and the plane of the current image among the associated comparison target images. In a case where the image includes a plurality of planes, comparison is performed for each plane. Based on the plane comparison, the diagnostic unit 107 detects the deteriorated portion by detecting and extracting the difference between the previous and current images. As a result, the diagnostic unit 107 obtains two-dimensional coordinate information representing the deteriorated portion in the image. Note that this two-dimensional coordinate information may be information of a single representative minutia, or may be information constituted by a plurality of minutiae according to the shape and size of the region having the deteriorated portion.

The association and comparison are not processes at the image level but are processes at the plane level which are relatively easier to perform, whereby it is possible to improve efficiency of diagnostic processing and reduce erroneous detection.

In addition, in a case where the plane matching method is used, processing at the plane level is performed thereafter at the time of coordinate conversion processing in the converter 107C using information of the plane portion.

[Diagnostic Processing: Plane Matching Method (2)]

FIG. 7 shows the plane matching method of the above-described diagnostic processing. The upper portion of FIG. 7 shows examples of reference images and diagnostic images. In Example 1, a diagnostic image 601 and a reference image 602 are images obtained by aerially photographing the same portion (such as the side wall of the building in FIG. 4) of the same target 5. Example 1 shows a case where the predetermined wall design includes a plurality of plane regions delimited by lines. Since conditions differ at the times of photographing, contents of the two images differ. In the present example, a crack-like deteriorated portion 701 is present in the diagnostic image 601.

Likewise, in Example 2, a diagnostic image 603 and a reference image 604 are images obtained by aerially photographing the same portion (such as a three-dimensional structure protruding from the side wall) of the same target 5. In the present example, a crack-like deteriorated portion 702 is present in the diagnostic image 603.

In the diagnostic system of the comparative example, association and comparison is performed on such images at the image level. Planes (plane portions) are included in each image according to the structure and design of the surface of the target 5. Such planes are detected and used in the plane matching method. The diagnostic unit 107 detects the minutia or the edge line from within the image, and detects, as a plane, the regions roughly having the same color. In the present example, for example, three plane portions (referred to as planes p11 to p13) are detected from the diagnostic image 603. In addition, three plane portions (referred to as planes p21 to p23) are detected from the reference image 604.

The diagnostic unit 107 performs association and comparison between the images by using the planes detected from the images (plane-level matching). The diagnostic unit 107 first performs association between one or more previous images and one or more current images using the planes using the planes, and associates the images as comparison target images. Next, the diagnostic unit 107 compares the planes in the comparison target images using each plane in each image. For example, the planes p11 to p13 of the diagnostic image 603 and the planes p21 to p23 of the reference image 604 are compared with each other. The diagnostic unit 107 estimates that, for example, the planes p11 and p21 correspond to each other based on the positional relation or similarity in shape of the planes, and associates the planes p11 and p21 to each other as comparison target planes. Likewise, based on the estimation, the planes p12 and p22 are associated with each other, and the planes p13 and p23 are associated with each other. Then, the diagnostic unit 107 compares the planes among each of the comparison target planes and determines a difference therebetween to detect the deteriorated portion. For example, the deteriorated portion 702 can be detected by comparing the planes p12 and p22. In a case where the deteriorated portion crosses over a plurality of planes, the deteriorated portion can be detected by detecting the portion in each comparison target plane and integrating the deteriorated portions into one. The diagnostic unit 107 obtains the two-dimensional coordinates representing the deteriorated portion 702 in the image.

In the above-described plane-level matching, image analysis processing is easier than the conventional image-level matching, and its processing load is low. Thus, it is possible to improve efficiency of diagnostic processing.

[Deteriorated Portion Detection Processing]

The diagnostic unit 107 may perform processing as described below when detecting the deteriorated portion from the above-described images. The diagnostic unit 107 may determine the deterioration type or degree of deterioration of the deteriorated portion 702 by performing a predetermined processing. In this case, examples of deterioration type are defined as cracks, rust, corrosion, peeling and the like. For example, in a case of detecting cracks, the location or region of the crack, the size of the region of crack, the number of crack lines, the length of the crack, the width of the crack and the like are determined. Based on quantified numerical values thereof, degree of deterioration of the crack is determined. For example, degree of deterioration is determined at several levels based on comparison with a reference threshold value for the crack.

[Conversion Processing]

Figure 8:
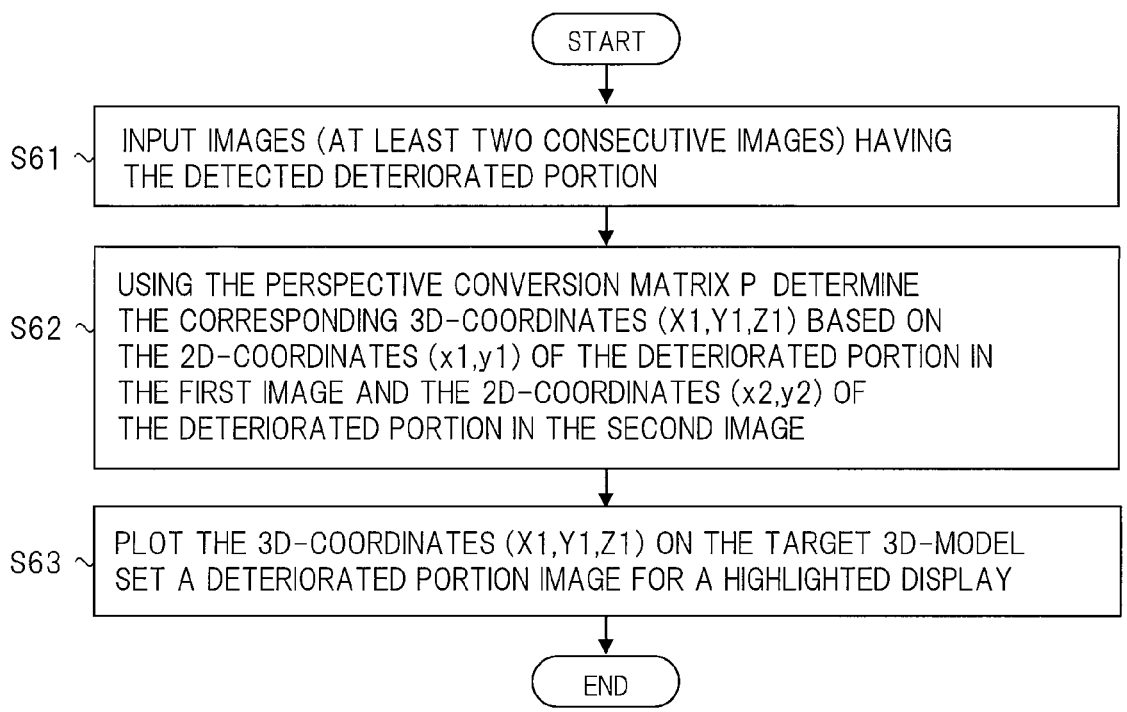
FIG. 8 is a flowchart showing an overview of coordinate conversion processing of the embodiment.

FIG. 8 shows the processing flow in which conversion processing (S6) is performed by the converter 107C of the diagnostic unit 107. FIG. 8 includes steps S61 to S63.

Figure 9:
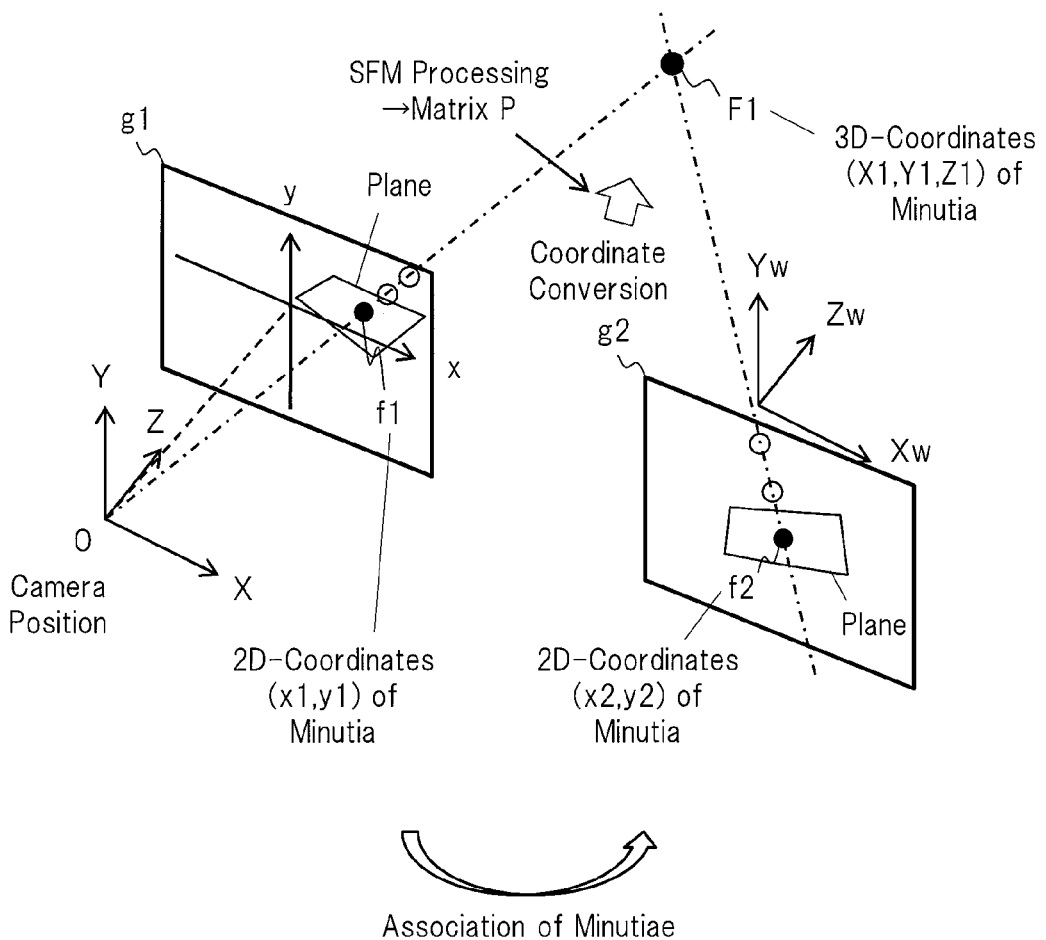
FIG. 9 is a drawing showing an overview of coordinate conversion processing of the embodiment.

(S61) Based on the diagnostic image group, the converter 107C inputs at least two consecutive images as images (diagnostic images) in which the deteriorated portion is detected (FIG. 9 described below). Note that no conversion can be performed in a case where there are less than two images, whereby the present processing flow would not be available.

(S62) By performing coordinate conversion using the known perspective conversion matrix P, the converter 107C obtains the corresponding three-dimensional coordinates (X1,Y1,Z1) based on the two-dimensional coordinates (x1,y1) representing the deteriorated portion in the first image in the input consecutive images and the two-dimensional coordinates (x2,y2) representing the corresponding deteriorated portion in the second image. The perspective conversion matrix P is obtained beforehand from a separate SFM processing. The three-dimensional coordinates obtained through conversion represents the location of the deteriorated portion in an area including the target three-dimensional model. Similar processing can be achieved in a case where there are three or more consecutive images, and in this case, conversion accuracy can be improved.

Figure 12:
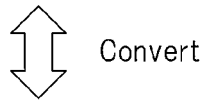
FIG. 12 is a drawing showing a configuration example of deteriorated portion information of the embodiment.

(S63) The converter 107C plots the obtained three-dimensional coordinates as the location of the deteriorated portion on the target three-dimensional model. This plotting can be achieved as association processing in the information processing (FIG. 12 described below). In addition, the converter 107C sets a deteriorated portion image for highlighting the deteriorated portion on the target three-dimensional model with a predetermined color or an icon to be shown at the time of visualization.

[Coordinate Conversion]

FIG. 9 shows an overview of the above-described coordinate conversion in which three-dimensional coordinate information is obtained from two consecutive images including the deteriorated portion. A three-dimensional coordinate system of the area including the camera 4 is indicated by (X,Y,Z). "○" denotes the camera position and a two-dimensional coordinate system in the image is represented by (x,y).

The two consecutive two-dimensional images include a first image g1 and a second image g2. The two-dimensional coordinate system in the first image g1 includes a minutia f1 (solid dot) corresponding to the deteriorated portion. The two-dimensional coordinates of the minutia f1 are indicated by (x1,y1). Likewise, the second image g2 includes a minutia f2, and the two dimensional coordinates of the minutia f2 are indicated by (x2,y2). Here, a case where the image includes a single minutia will be described in a simplified manner. However, it the same applies to a case where the image includes a plurality of minutiae. The converter 107C performs association of minutiae from the minutia f1 to the minutia f2.

A minutia corresponding to the deteriorated portion in the three-dimensional area including the target is set as a minutia μl. Three-dimensional coordinates of the minutia F1 are indicated by (X1,Y1,Z1). The converter 107C obtains the three-dimensional coordinates (X1,Y1,Z1) of the minutia F1 representing the deteriorated portion in the three-dimensional area by performing coordinate conversion from the two images g1 and g2 using the perspective conversion matrix P.

[Conversion Processing: Plane Conversion Method (1)]

At the time of the above-described coordinate conversion (FIGS. 8 and 9), a method of selecting the two-dimensional coordinates is devised such that it is possible to improve efficiency. In the diagnostic system of the modification example, the following plane conversion method is used for devising this method. In the plane conversion method, two-dimensional coordinates are selected by using plane information of the above-described plane matching method. Thus, it is possible to improve efficiency of conversion processing.

Figure 10:
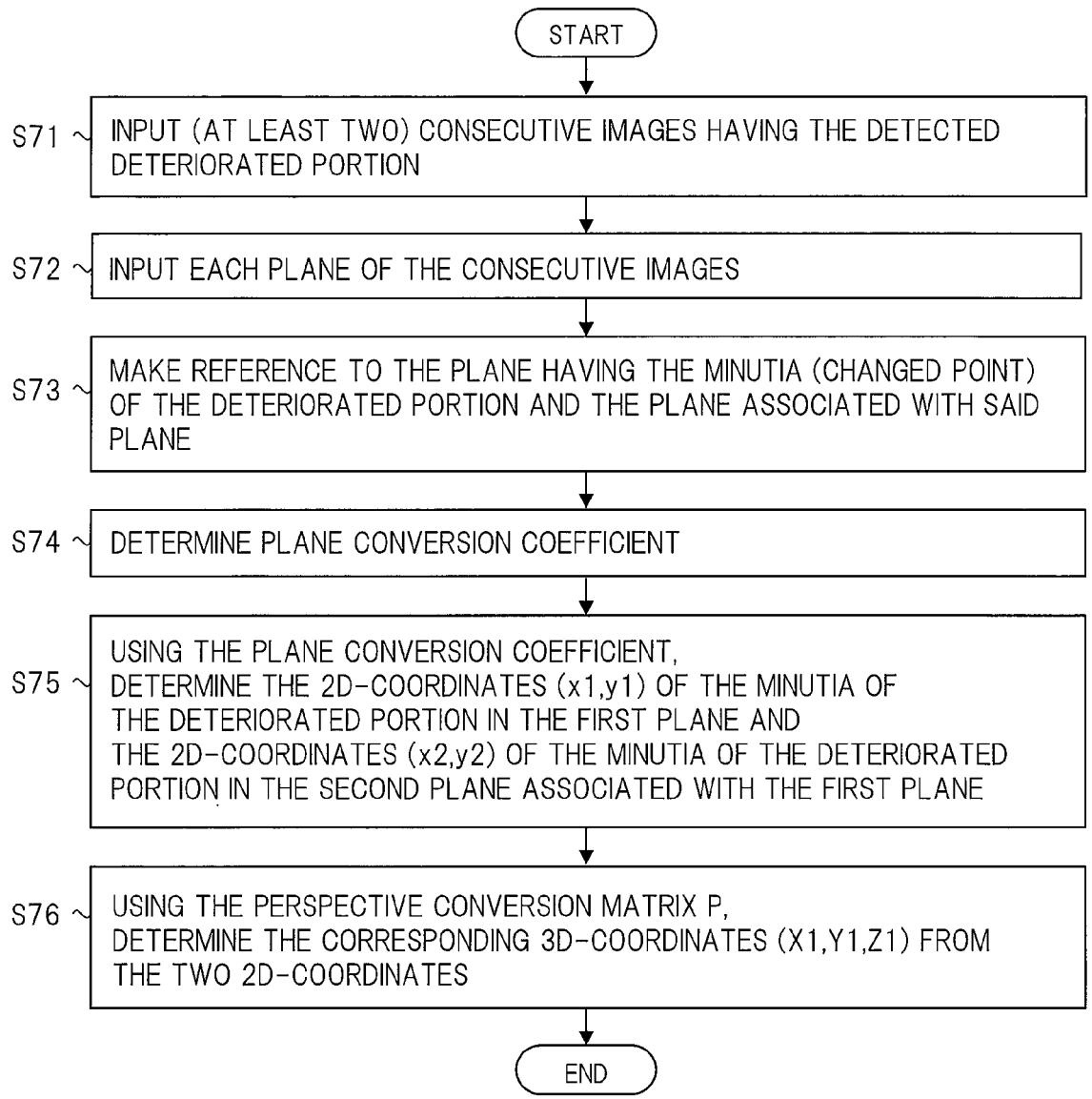
FIG. 10 is a flowchart showing coordinate conversion processing in a plane conversion method according to a modification example of the embodiment.

FIG. 10 shows the processing flow in a case where the plane conversion method is applied at the time of conversion processing as the modification example. FIG. 10 includes steps S71 to S76.

(S71) The converter 107C inputs at least two images of the consecutive images in which the deteriorated portion is detected.

(S72) the converter 107C inputs information of each plane detected by the above-described plane detection in the consecutive input images.

(S73) The converter 107C makes reference to the plane (first plane) in a certain diagnostic image (first image) in which the deteriorated portion (minutia) is detected and the second plane of the second image associated with the first plane of the first image. This corresponds to, for example, the planes p12 and p22 of the comparison target planes in FIG. 7.

(S74) The converter 107C calculates a plane conversion coefficient of the planes (first and second planes) to be associated.

(S75) The converter 107C determines the two-dimensional coordinates (x1,y1) of the deteriorated portion in the first plane of the first image and the two-dimensional coordinates (x2,y2) of the deteriorated portion in the associated second plane of the second image by using the plane conversion coefficient.

(S76) The converter 107C determines the three-dimensional coordinates (X1,Y1,Z1) of the deteriorated portion from the two-dimensional coordinates (x1,y1) and the two-dimensional coordinates (x2,y2) by using the perspective conversion matrix P.

[Conversion Processing: Plane Conversion Method (2)]

Figure 11:
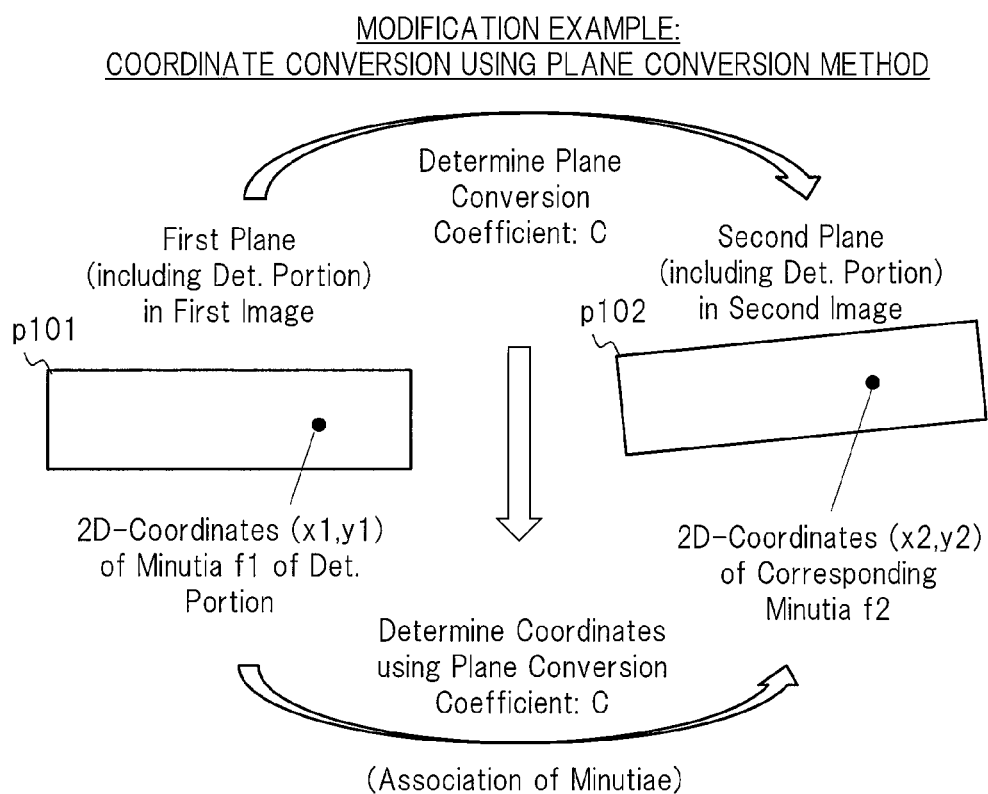
FIG. 11 is a drawing showing coordinate conversion processing in the plane conversion method of the modification example of the embodiment.

FIG. 11 shows coordinate conversion calculation in the above-described plane conversion method. The drawing shows a first plane p101 in the first image including the deteriorated portion, and a second plane p102 in the second image. The first plane p101 and the second plane p102 are comparison target planes to be associated and compared by plane matching. The first plane p101 includes first coordinates (x1,y1) of the minutia f1 representing the deteriorated portion. The second plane p102 includes second coordinates (x2,y2) of the minutia f2 corresponding to the minutia f1. The computer system 100 determines a plane conversion coefficient C for converting from the first plane p101 to the second plane p102. The computer system 100 determines the second coordinates (x2,y2) of the minutia f2 from the first coordinates (x1,y1) of the minutia f1 by performing coordinate calculation using the plane conversion coefficient C.

As described above, coordinate conversion from the two-dimensional coordinates of the deteriorated portion to the three-dimensional coordinates is performed. At this time, two-dimensional coordinate information for a plurality of viewing position as shown in FIG. 9 are necessary. At this time, in order to collect information on the plurality of viewing positions, it is necessary to perform association processing at the image level. When processing is performed, erroneous association of minutiae is likely to occur. When such an error occurs, it affects the plotting accuracy on the target three-dimensional model. Thus, in the modification example, plane conversion method uses a method in which two-dimensional coordinates of the deteriorated portion (minutia) are calculated. In the plane conversion method association processing for the minutiae at the image level is unnecessary. Thus, plotting accuracy of the target three-dimensional model can be improved.

[Deteriorated Portion Information]

FIG. 12 shows a configuration example of the data storage of deteriorated portion information among the diagnostic result information. Deteriorated portion information is stored in a DB table. Data is managed in a similar structure as previous reference data and current diagnostic data.

Although not shown, data is managed in chronological order using information such as imaging date and time.

The table in part (A) of FIG. 12 represents a two-dimensional image data table. Two-dimensional information obtained by processing the two-dimensional image is stored in the table. The columns of the table indicate image file, image size, deteriorated portion ID, and two-dimensional coordinates of the deteriorated portion. The image file indicates the image of each still image in the consecutive images. The image size is expressed by the number of pixels and the like in vertical and horizontal direction of the image. The deteriorated portion ID indicates an identifier for the deteriorated portion (portion in which a deterioration is likely to occur) detected from the image. The two-dimensional coordinates of the deteriorated portion indicate the two-dimensional coordinates (x,y) representing the location of the deteriorated portion in the image.

Part (B) of FIG. 12 shows a three-dimensional model data table. Three-dimensional information obtained by the above-described conversion from two-dimensional to three-dimensional plotting is stored in the table. The columns of the table indicate deteriorated portion ID, three-dimensional coordinates (X,Y,Z) of the deteriorated portion, and corresponding two-dimensional image file. The deteriorated portion ID is generated based on the deteriorated portion ID of the two-dimensional image data table. The three-dimensional coordinates (X,Y,Z) of the deteriorated portion are three-dimensional coordinates of the deteriorated portion plotted on the target three-dimensional model. The corresponding two-dimensional image file indicates a file for the two-dimensional image (image including the deteriorated portion) and is associated with the image file in the two-dimensional image data table.

[Deteriorated Portion Visualization Function]

FIG. 13 shows the deteriorated portion visualization function for performing plotting of the deteriorated portion from two-dimensional to three-dimensional, and an example of the screen.

Part (A) of FIG. 13 shows an example of a diagnostic image 1301 and shows a case where a deteriorated portion 1303 is detected from a portion of a three-dimensional structure 1302 on the side wall of the target 5. The two-dimensional coordinates of the deteriorated portion 1303 are indicated by (x1,y1). As described above, the converter 107C of the computer system 100 performs processing in which the two-dimensional coordinates (x1,y1) of the deteriorated portion 1303 of the diagnostic image 1301 are converted into the three-dimensional coordinates (X1,Y1,Z1) on the target three-dimensional model. Further, the visualizer 108 generates a screen in which the deteriorated portion is plotted on the target three-dimensional model based on conversion information and is visualized.

Part (B) of FIG. 13 shows a configuration example of such a visualization screen. A target three-dimensional model 1311 viewed from a preset viewing position is displayed in the background of the screen. The target three-dimensional model 1311 representing the target 5 is indicated as a three-dimensional point group. The viewing direction, zoom-in/zoom-out ratio or the like of the screen can be changed according to user operations. Basic information of the target 5, the route, the start/finish point and the like may be displayed the around the target three-dimensional model 1311. Further, the three-dimensional coordinates (X1,Y1,Z1) of a deteriorated portion 1313 are plotted on a surface of the target three-dimensional model 1311. In a case where the deteriorated portion is indicated as a two-dimensional region the deteriorated portion includes information such as size. The deteriorated portion is highlighted and displayed as an image by the above-described conversion processing. In this manner, the user can easily confirm the location of the deteriorated portion in the entire target 5 and the like via the present screen. For example, in a case where the surface structure of the target 5 is complicated and has many portions having similar structures, it would be difficult to recognize the deteriorated portion from the image but would be easy to confirm the deteriorated portion by plotting on the three-dimensional model.

Part (C) of FIG. 13 shows a configuration of another visualization screen transitioning from the screen of part (B). If the user wishes to confirm details of the deteriorated portion, the user performs a selection operation (such as clicking or tapping) on the deteriorated portion. Thus, the visualizer 108 configures and displays a screen as shown in part (C). Note that the screen in part (B) may be transitioned to the screen in part (C) such that the entire screen in part (C) is displayed, or the screen of part (C) may be overlapped and displayed on the screen in part (B). In addition, it is possible to return to the screen in part (B) from the screen in part (C) by predetermined user operations. In the screen in part (C), an enlarged deteriorated portion is displayed at a center of the screen along with various information (such as diagnosis date and time, target name, deterioration type, degree of deterioration) of the deteriorated portion. In addition, two-dimensional images (portion of the diagnostic image group) including the deteriorated portion may be displayed in association with each other based on predetermined user operations Further, in the screen in part (B) and part (C), the deteriorated portion is highlighted and displayed. For example, two-dimensional region including the deteriorated portion may be highlighted and displayed with a colored frame according to the deterioration type or degree of deterioration. In addition, the screen in part (C) can display the comparison between the current and previous images of the deteriorated portion based on predetermined user operations (see below).

Figure 14:
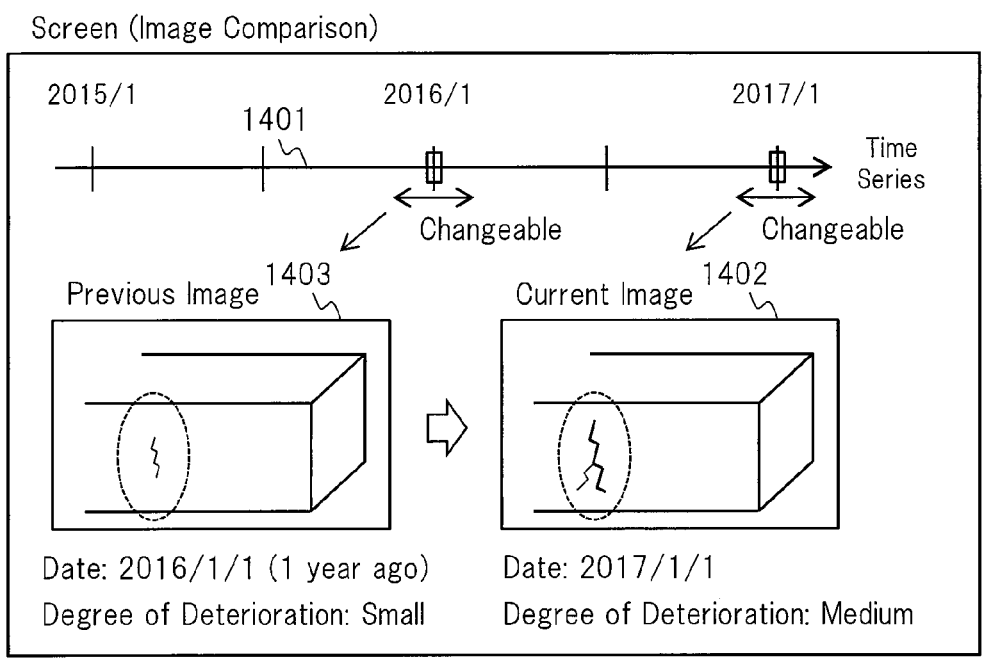
FIG. 14 is a drawing showing a second configuration example of a screen for plotting and visualizing on a three-dimensional model of the embodiment.

FIG. 14 shows a display screen for image comparison as an example of another visualization screen. It is possible to designate the deteriorated portion in the screen in part (B) or part (C) of FIG. 13, and allow the screen transition to the screen in FIG. 14 based on the predetermined user operation. The visualizer 108 displays comparison images of the deteriorated portion designated by the user on the screen in previous and current time series. GUI components such as a bar 1401 and the like in which the time series can be can be selected, a current image 1402 and a previous image 1403 are displayed on the screen. First, the current image 1402 (diagnostic image including deteriorated portion) of the designated deteriorated portion is displayed. For example, in a case where the current date is January 2017 and a reference image of the corresponding reference data is available in the previous date which is the predetermined amount of time prior to the current date (such as one year ago), the previous image 1403 is displayed. In addition, in a case where the corresponding data is available, the user can optionally change the two previous and current dates of the comparison targets by using the bar 1401. The images in which the two dates have been changed are displayed as the current image 1402 and the previous image 1403. Information such as degree of deterioration may also be displayed in each image.

As another of example of the screen display, a plurality of images at three or more dates may be compared and displayed, or animated effects may be displayed when switching between the plurality of images of the same region.

As described above, in the deterioration visualization function, the user can confirm details of the corresponding image contents along with the location of the detected deteriorated portion on the target three-dimensional model via the screen. The user can easily confirm the changed state such as the degree of deterioration and the like caused by progress of the deteriorated portion in time series from the previous to current state. Thus, it is possible to contribute to inspection and repair schedules and the like.

Deteriorated Portion Visualization Function: Modification Example

The following may also be provided as a modification example of the deteriorated portion visualization function and screen. First, the visualizer 108 displays the target three-dimensional model on a screen as shown in part (B) of FIG. 13, without displaying the deteriorated portion (diagnostic result information). The user performs operations in which a desired portion on the target three-dimensional model is selected based on his/her knowledge of the structure of the target 5 or previous deterioration occurrence results. For example, in a case where the target 5 is a bridge and it is known that the bridge has a portion where deterioration is likely to occur by the structure of the bridge, this portion is selected. In a case where previous reference data and current diagnostic data of the selected portion (point or region) are available, the visualizer 108 makes reference to diagnostic result information of this portion. Based on this diagnostic result information, the visualizer 108 generates and displays a screen in which the deteriorated portion is plotted on the target three-dimensional model, or generates and displays a screen displaying the comparison between the previous and current images, or the like.

The following may also be provided as another modification example. After the computer system 100 acquires aerially-photographed images and the like from the drone 1, the computer system 100 does not immediately execute diagnostic processing. The visualizer 108 displays the target three-dimensional model on the screen. The user performs operations in which a desired portion (point or region) which is a diagnostic processing target via the screen. The computer system 100 confirms availability of the previous reference data and current diagnosis data corresponding to the selected and designated portion and reads the data. The computer system 100 executes diagnostic processing on the selected portion using the read data. Based on this diagnostic result information, the visualizer 108 generates and displays a screen in which the deteriorated portion is plotted on the target three-dimensional model, or generates and displays a screen displaying the comparison between the previous and current images, or the like.

In a case of the above-described modification example, since diagnostic processing is performed on a piece of the image data, diagnosis can be performed in a short processing time although the entire region of the target 5 will not be diagnosed.

[Effects and the Like]

As described above, according to the aircraft-utilizing deterioration diagnostic system of the embodiment, diagnosis efficiency and accuracy can be improved when comparing the previous and current aerially-photographed images to perform diagnosis of the deteriorated state or the like of the target. According to the present diagnostic system, it is possible to support deterioration diagnostic operations based on aerially-photographed images taken by an aircraft, improve efficiency, and further automate the deterioration diagnosis. According to the present diagnostic system, it is possible to reduce frequency of visual confirmation and the like of the image in person, and achieve deterioration diagnosis at a low cost. According to the present diagnostic system, the deteriorated portion and the like can be visualized on the target three-dimensional model on the screen, whereby the person performing the diagnosis can easily recognize the deteriorated portion and the like, and inspection, repairs and the like can be simplified.

Modification Example (1)

The following is an example of the diagnostic system in a modification example of the embodiment. In the above-described diagnostic unit 107 of the modification example, when performing diagnostic processing (S4 of FIG. 5 and FIG. 6) including association and comparison processing between the previous and current image groups using the plane matching method (or image-level matching method), a known machine learning method may be applied. A deep learning method may be applied for the machine learning method. For example, the deteriorated portion can be automatically detected by performing the machine learning to perform association and comparison processing at the plane level as shown in FIG. 7. The diagnostic unit 107 detects the deteriorated portion by applying the machine learning (such as deep learning) processing to each image among the input diagnostic image group and reference image group. In a case where machine learning is used, learning is performed beforehand by inputting the image and the like including the deteriorated portion as empirical information of machine learning.

Modification Example (2)

In the above-described embodiment, at the time of aerial photographing, a method is applied such that diagnostic processing is started while obtaining photographed image data and similar processing is performed on the diagnostic image group and the reference image group. However, the configuration is not limited to this and other configurations may be applied. In the modification example, processing for detecting the plane and the like in the plane matching method, this processing result information of the image group of reference data is stored beforehand in the DB as processing prior to the diagnosis date and time. Thus, when performing diagnostic processing at the diagnosis date and time, processing result information of reference data with respect to diagnostic data is read and processed, whereby the entire processing time can be reduced.

Modification Example (3)

When association and comparison processing of the plane matching method is applied to the above-described previous and current image group, there may be a case where detecting and the like of the plane are difficult depending on the image. For example, in a case where the surface structure of the target 5 is complicated, noise is increased, whereby planes may be prevented from being detected or only several detailed planes may be detected. In the diagnostic system of the modification example, in a case where the input image is an image in which a plane is difficult to detect, the image is treated as an exception, and applies other processing such as image-level matching processing without applying plane matching processing.

Modification Example (4)

In the above-described diagnostic processing, the deteriorated portion is detected by comparing the associated images and determining the difference therebetween. At this time, noise generally occurs depending on the processing method. Reducing the noise is effective in improving the diagnostic accuracy. Therefore, two-stage noise removal processing is applied to the diagnostic system of the modification example. In the first stage, the computer system 100 applies predetermined noise removal processing such as predetermined filter processing to all image data of the comparison target images. After the noise removal processing in the first stage, the computer system 100 evaluates the noise level regarding the noise remaining in the image by using a predetermined evaluation processing. The computer system 100 compares the noise level obtained by the evaluation and a predetermined threshold value and applies noise removal processing of a second stage of the image including a noise portion in which the noise level exceeds the threshold value. Noise removal processing of the second stage is, for example, a predetermined filtering process and the like that is separate from that of the first stage. Thus, it is possible to reduce erroneous detection of the deteriorated portion at the time of diagnostic processing.

Modification Example (5): Routing Method

Hereinafter, the routing method among the additional functions will be described as a modification example. In the function of the routing method, a suitable route for the drone 1, diagnosis date and time, photographing setting information and the like for current and future diagnosis are automatically generated and are preset based on the previous route, reference data and the like. The suitable route, diagnosis date and time, and photographing setting information represent the route, diagnosis date and time, and photographing setting information in which deviations and the like between the previous image contents and the current image contents are reduce. Specifically, the route, diagnosis date and time, and photographing setting information are set considering the light and wind conditions, season, weather and the like of the environment surrounding the target 5 such that the diagnostic target region appears as clear as possible. In other words, the current suitable route is generated according to a predetermined correction based on the previous set route. This function allows actual aerial photographing to be performed according to the preset route, diagnosis date and time, and photographing setting information. Thus, it is possible to easily obtain the diagnostic image group in which the difference between the previous and current image contents is small and in which the same diagnostic target region are clearly shown. Thus, association and comparison processing can be simplified and diagnostic accuracy can be improved.

FIG. 15 shows examples of the route around the target 5, photographing setting information and the like of the above-described function of the routing method. Part (A) of FIG. 15 shows the basic route and photographing setting information set at a previous date and time. The basic route and photographing setting information are set so as to photograph, for example, the diagnostic target region of the side wall of the target 5. The photographing direction, photographing conditions and the like are set per position (three-dimensional coordinates) and per imaging point of the drone 1 and the camera 4 along the basic route.

Part (B) of FIG. 15 shows the suitable route (correction route) and photographing setting information generated using the routing function based on the basic route of part (A), photographing setting information, and reference data obtained as a result of actual aerial photographing.

In the present routing method, when setting the suitable route, the portion determining spatial information (such as position along the route) is determined based on the previous route and the actual navigation result information along the route. The portion determining temporal information (such as diagnosis date and time, and the imaging point on the route) in the suitable route is determined considering the season, weather, sunlight, shadow, wind direction and speed, positional relation between the drone 1 and the target 5, the photographing direction of the camera 4, and the like based on the time information of the previous route.

The computer system 100 obtains the correction route and the photographing setting information by correcting the basic route and photographing setting information based on the correction calculation considering the wind and light conditions. The computer system 100 performs the correction calculation considering the wind direction and speed, direction of the sunlight, the amount of the light, the positional relation between the target 5 and the drone 1, and the like according to the season or the weather. The position on the route, the imaging point, the photographing direction, the photographing conditions and the like are corrected according to the correction calculation.

The following are examples of corrections performed in the present function.
  Set the diagnosis date and time to a date and time in which light is more likely to hit.
  Correct the photographing direction or photographing conditions for regions in which light is less likely to hit.
  Correct the imaging point and time intervals according to the wind direction and the like.

In addition, the computer system 100 judges the image contents considering the wind and light conditions from the reference image group at the time of the aerial photographing on the basic route of part (A), and may detect, for example, a portion where deviations from the diagnostic target region is large, or a portion where clearness is insufficient, or the like. In addition, the computer system 100 may measure the wind speed, wind direction, temperature and the like using, for example, a sensor at the diagnosis date and time, and may correct the route and the photographing setting information considering the measured value.

According to the present function differences in the image contents of temporally differing images can be reduced based on settings of the suitable route and the like, whereby the association and comparison processing can be simplified and the diagnostic accuracy can be improved.

In the diagnostic system of the embodiment, the user sets the basic route of the drone 1 and allows it to be autonomously navigated along the route at the diagnosis date and time. There is no need for the user to maneuver the drone 1 at the diagnosis date and time. In addition, the route is set in compliance with a predetermined rule. An example of the rule includes a predetermined season, time period or place in which navigation of the drone is allowed. In addition, there are restrictions on the altitude of the aircraft during navigation and the weight of the aircraft. Further, a predetermined distance is provided between the aircraft and the target. In a case where there are many people below the aircraft, the aircraft is set so as to be unflyable.

[Routing Processing]

Figure 16:
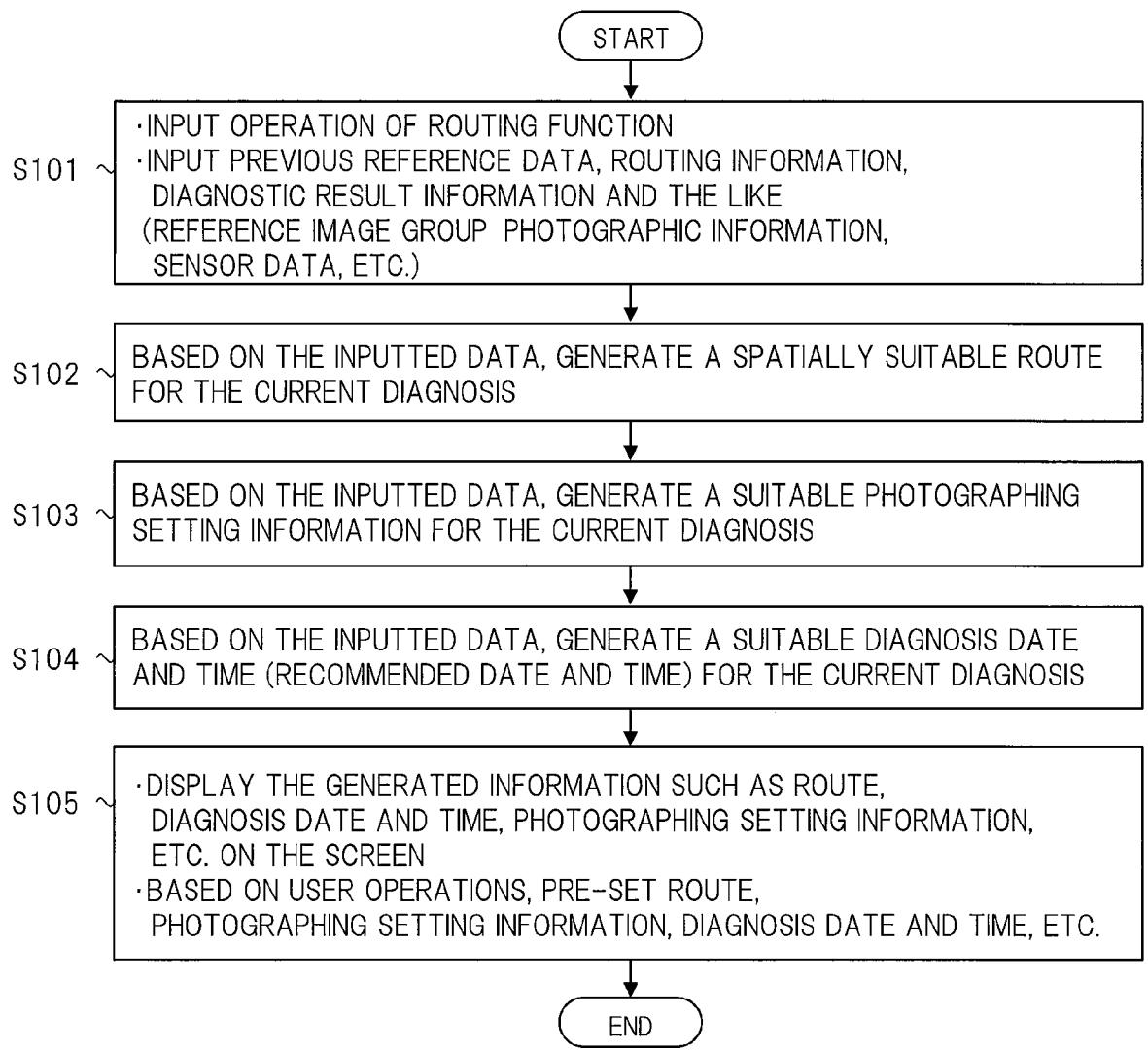
FIG. 16 is a drawing showing a processing flow of a routing function according to a modification example of the embodiment.

FIG. 16 shows the processing flow of the routing function of the computer system 100. FIG. 16 includes steps S101 to S105.

(S101) In a case where the routing settings of the routing function is instructed based on user operations via the settings screen, the computer system 100 reads and inputs the previous routing information, reference data, diagnostic result information and the like. The reference data includes the reference image group, reference sensor data, photographic information and the like. The photographic information includes dates and times of the diagnosis and aerial photographing, photographing timing (the imaging point on the route), photographing setting information of the camera 4 and the like.

(S102) The computer system 100 generates a spatially suitable route for diagnosis at the current date and time based on inputted data such as the set route and the reference data at the previous date and time. The spatially suitable route is a route that allows aerial photographing of the diagnostic target region of the target 5 with little deviation and the like from the route. The navigation route of the previous result includes deviations and the like from the set route. The computer system 100 generates the suitable route such that the deviation is reduced.

(S103) The computer system 100 generates suitable photographing setting information of the camera 4 for diagnosis at the current date and time based on the inputted data such as the photographic information and the like at the previous date and time. The suitable photographing setting information includes the photographing direction, photographing timing, photographing conditions and the like in which photographing of the diagnostic target region of the target 5 is allowed with little deviation or the like.

(S104) The computer system 100 generates a suitable diagnosis date and time for diagnosis at the current date and time based on the inputted data including the diagnostic result information and the like at the previous date and time. The suitable diagnosis date and time is the season or time period in which the diagnostic target region of the target 5 can be clearly photographed as much as possible.

(S105) The computer system 100 displays each piece of information such as the generated route, diagnosis date and time, photographing setting information and the like on the settings screen and performs confirmation to the user. The user confirms each piece of information in settings screen and, if the pieces of information are to be adopted, presses the OK button. The user can correct a portion of the provided information and adopt the corrected information. Thus, the computer system 100 presets the suitable route, diagnosis date and time, photographing setting information and the like for the current or future diagnosis.

Modification Example (6): Camera Adjustment Method

Hereinafter, a function of the camera adjustment method among the additional functions will be described as a modification example. In the function of the camera adjustment method, photographing controls are performed such that the photographing settings of the camera 4 are adjusted in real-time during navigation of the drone 1 along the route. The adjustment changes the photographing settings such that deviations and the like in the current image are reduced with respect to the previous image. Specifically, at the time of aerial photographing, the photographing direction of the camera 4 photographing timing, photographing conditions and the like are corrected such that the degree of overlapping between the previous and current images at each predetermined imaging point on the route is maximized.

Figure 17:
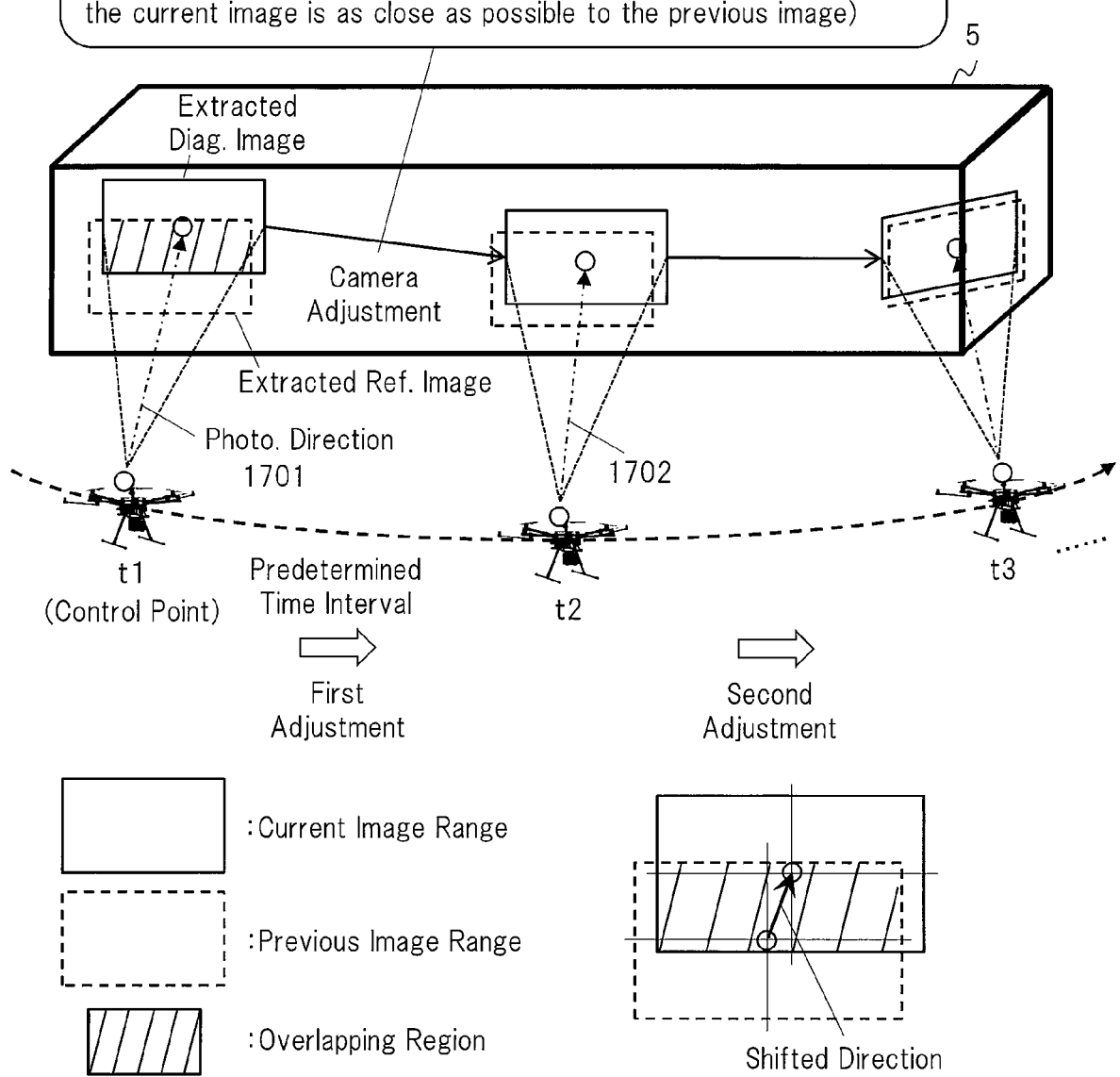
FIG. 17 is a drawing showing a camera adjustment method according to a modification example of the embodiment.

FIG. 17 shows an example of camera adjustment during aerial photographing as a camera adjustment method in the modification example. In this function, at the time of aerial photographing by the drone 1, the photographing direction and the like of the camera 4 is adjusted in real-time such that the diagnostic target region of the target 5 is photographed for each control point at the predetermined time intervals with minimal deviation from the previous image. Thus, the aerially-photographed image contents at the current diagnosis date and time is made as close as possible to the previous reference image contents. Thus, association and comparison processing can be simplified and diagnostic accuracy can be improved at the time of diagnostic processing.

Specifically, the computer system 100 calculates the degree of overlapping between the current image and the previous image for each control point (such as time points t1, t2 and t3) at the predetermined time intervals. The overlapping region between the current image and the previous image is indicated by a hatched-line region. The computer system 100 adjusts the photographing setting information such as the photographing direction of the camera 4 and the like in real-time such that the degree of overlapping between the control points is maximized. For example, adjustment processing is performed such that, based on conditions at time point t1, the photographing setting information at the subsequent time point t2 is adjusted.

The adjustment processing (correction processing) of the camera 4 in this method is achieved by reducing the processing load by performing processing at predetermined time intervals for each control point which is wider than the imaging point. In this method, correction processing is performed for each image at predetermined time intervals. However, it may be configured such that adjustment processing is performed for each group (such as the thumbnail image in the group) at this time using the grouping settings described below. In addition, as a modification example, a similar object may be achieved by adjusting not only the photographing setting information of the camera 4 but also the navigation parameters of the drone 1.

[Camera Adjustment Processing]

FIG. 18 shows the processing flow of the camera adjustment function. FIG. 18 includes steps S201 to S205.

(S201) The computer system 100 allows the drone 1 to perform aerial photographing at the diagnosis date and time based on the settings. The computer system 100 receives and inputs the aerially-photographed image data from the drone 1 (camera 4) in real-time. The computer system 100 sequentially extracts each image (referred to as extracted diagnostic image) for each control point of the predetermined time interval from the consecutive images of the input diagnostic image group stored in time series.

(S202) Based on the extracted diagnostic image, the computer system 100 makes reference to the corresponding reference image group, and extracts an image (referred to as extracted reference image) from the reference image group by association using the photographic information of each image. The computer system 100 associates the extracted reference image and the extracted diagnostic image as the comparison target images.

(S203) The computer system 100 calculates the degree of overlapping between the previous image and the current image of the associated comparison target images as an overlapping rate. In addition, the computer system 100 calculates the direction (FIG. 17, shifted direction) in which the images are deviated or the like. The shifted direction can be obtained as, for example, a vector connecting center points of both images. Note that the overlapping area and the like may be calculated without being limited to the overlapping rate.

In addition, the computer system 100 may use the above-described plane matching processing when calculating the overlapping rate of both images. In this case, the overlapping rate between the planes in each image is calculated. Thus, it is possible to improve efficiency of adjustment processing.

(S204) The computer system 100 calculates the adjustment amount for adjusting the photographing setting information between control points at predetermined time intervals based on the overlapping rate and shifted direction. Here, it is assumed the photographing direction of the camera 4 is adjusted. The computer system 100 calculates the adjustment amount between the photographing direction of the camera 4 at the current time point (such as photographing direction 1701 of FIG. 17) and the photographing direction (such as photographing direction 1702) at the next time point. At this time, the computer system 100 calculates the number of pixels as the adjustment amount for moving in the direction (direction opposite to shifted direction) in which the overlapping rate of both images is increased. Then, the computer system 100 calculates the adjustment amount of the photographing direction of the camera 4 corresponding to the number of pixels for moving.

(S205) The computer system 100 controls in real-time so as to change the photographing setting information of the camera 4 for the next time point based on the adjustment amount obtained above. The above-described processing is similarly repeated for each time point.

Modification Example (7): Stepwise Association Method

Hereinafter, a function of the stepwise association method among the additional functions will be described as a modification example. As described above, association and comparison processing is generally difficult to perform and the processing load is high. Association would be difficult unless the images both have high degrees of similarities in the previous and current images contents. In the stepwise association method of the modification example, association processing between the previous and current image groups is achieved in, for example, two stages using grouping.

The computer of the computer system 100 divides the entire area including the target 5 into a plurality of groups (also referred to as zones) beforehand based on information such as the three-dimensional structure of the target three-dimensional model data, route, photographing setting information (such as photographing direction) and the like. The group corresponds to the zone of a rough category divided in time and space. The method of group is not particularly specified. For example, grouping may be performed according to the structural portion or the wall surface portion of the building. Further, grouping may be performed according to similarities in the photographing direction (or the direction to which the drone 1 advances).

At the time of the above-described association processing, the computer first performs a rough association in a unit of groups as a first association. The computer divides the diagnostic image group into a plurality of image groups so as to be associated with the divided groups. The computer associates a certain previous image group and a certain current image group as comparison target groups. The first association be relatively easily performed using the information in each group.

Next, after the first association, the computer performs association in a unit of images among the comparison target groups as a second association. The computer performs matching between images in the previous and current image groups at the above-described plane level or image level, and obtains the comparison target images. The computer performs comparison processing between the associated images in the group, and determines and detects the deteriorated portion. In a case where image-level matching is used, association is performed based on the plurality of minutiae detected from within each image.

After the two-stage association processing, the computer links the diagnostic result information after comparison processing in each unit of groups and integrates them into one to obtain general diagnostic result information.

FIG. 19 shows the stepwise association method of the modification example. Part (A) of FIG. 19 shows the reference image group and examples of the groups. The area includes groups G1, G2, G3 and the like. An image group is set so as to correspond to the group. Part (B) of FIG. 19 shows the diagnostic image group and examples of the groups. The area includes groups G11, G12, G13 and the like. An image group is set so as to correspond to the group. In the first association, the computer associates the image groups. For example, group G1 and group G11 are associated with each other. In the second association, the computer performs association between, for example, the plurality of images in group G1 and the plurality of images in group G11 by using the plane matching method or the like.

According to the above-described method, it is possible to improve efficiency of association processing and reduce processing time. The first association processing of the unit of groups can be further performed as follows. The computer system 100 performs the following processing beforehand regarding the plurality of groups among the reference image group. The computer system 100 selects a single image (referred to as thumbnail image) from the plurality of images for each group. For example, an image at the imaging point for the predetermined time interval is selected. Alternatively, an image corresponding to a specific portion may be selected, for example, on the target three-dimensional model. In FIG. 19, examples of thumbnail images are indicated by double-framed boxes. The computer stores position coordinate information and the like of the minutia in the image as detailed information for each selected thumbnail image within the group of reference data. At the time of first association processing, the computer performs association in the unit of groups by comparing the images among the diagnostic image group using the detailed information of the thumbnail image in the group.

Modification Example: Partial SFM Processing Method

Hereinafter, a function of the partial SFM processing method among the additional functions will be described as a modification example. In the partial SFM processing method, when there is a large amount of aerially-photographed image data, SFM processing is performed on some of the images rather than being performed on all of the images.

The known SFM processing is a process for restoring the three-dimensional structure (minutia and the like representing the surface structure) of the target, camera position and the like from plurality of two-dimensional images. In the present diagnostic system, when performing, for example, the above-described conversion, the three-dimensional structure (three-dimensional coordinates of the deteriorated portion) on the target three-dimensional model is restored from at least two consecutive images (two-dimensional coordinates of the deteriorated portion in the image) using SFM processing. However, the known SFM processing has a relatively high processing load such that executing a large amount of aerially-photographed image data would require a long period of time, thereby reducing efficiency.

Therefore, in the partial SFM processing method, SFM processing is executed on some images selected from a large number of potential aerially-photographed images to obtain three-dimensional information (minutia, three-dimensional coordinates) representing the deteriorated portion.

In order to select an SFM processing target, the entire area including the target 5 is divided into a plurality of zones (or the above-described groups) beforehand, and the diagnostic image group is divided into a plurality of image groups so as to correspond with the zones. The computer selects the unit of image groups of the zones as the SFM processing target.

In addition, in the partial SFM processing method, a plurality of SFM processing are executed in parallel for the image groups in each of the plurality of zones of the diagnostic image group, and the result information of the plurality of SFM processing is integrated into a single piece of result information. This function can reduce the diagnostic processing load and shorten the processing time.

Figure 20:
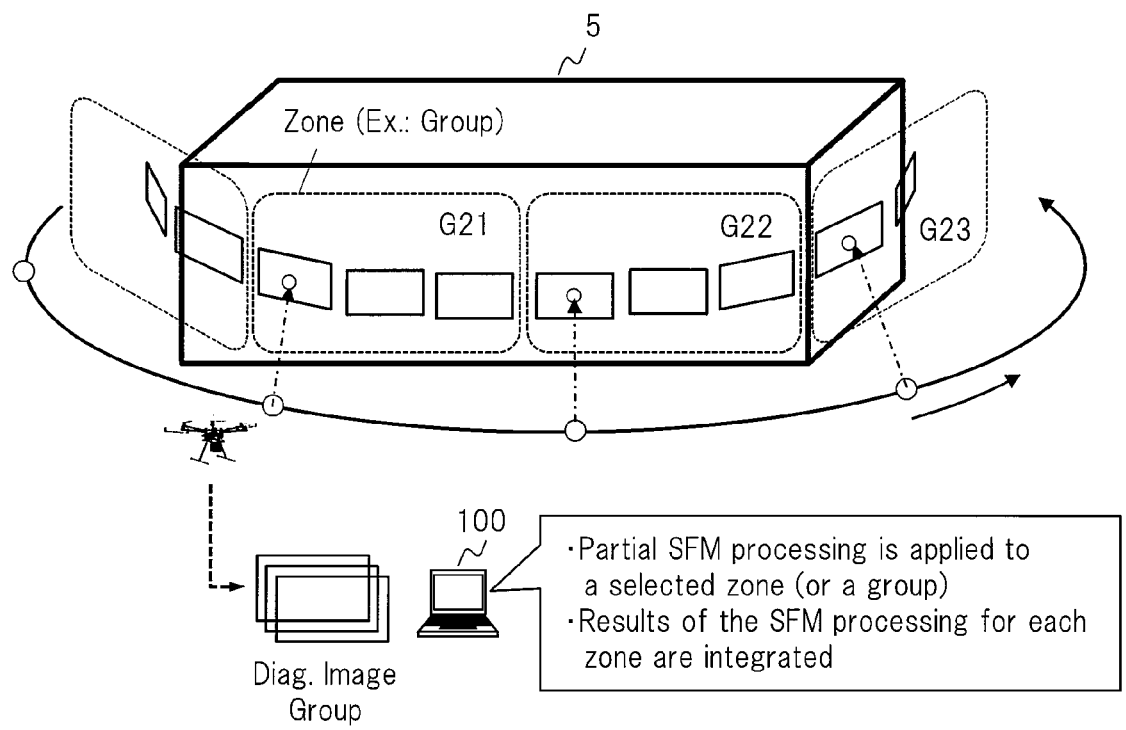
FIG. 20 is a drawing showing a partial SFM processing method according to a modification example of the embodiment.

FIG. 20 shows the partial SFM processing method of the modification example. The computer system 100 selects the unit of groups corresponding to the zone of the diagnostic image group and applies SFM processing. In FIG. 20, the plurality of zones include, for example, groups G21, G22 and G23. The group can be set beforehand. The computer divides the diagnostic image group into a plurality of image groups corresponding to the said group. The computer selects a SFM processing target group from the group of the diagnostic image group. In the present example, this is applied to all groups G21 to G23. The computer executes SFM processing on each group of the selected groups G21 to G23. For example, the SFM processor 107D may perform SFM processing of each group in the plurality of groups by parallel calculation processing. The computer system 100 integrates the information into a single piece of information after obtaining the SFM processing result information of each group.

Note that deviations or the like is likely to occur at the time of integration depending on the configuration of the method to divide the zones (groups). Thus, it is desirable that setting is performed so as to divide into suitable zones (groups) beforehand. For example, setting is performed such that the amount of information of the connecting portion between the zones (groups) is reduced. Thus, deviations or the like is less likely to occur at the time of integration, whereby the SFM processing accuracy can be improved.

Modification Example: Prioritized Aerial-Photographing Method

Hereinafter, the prioritized aerial-photographing method will be described as a modification example. In the prioritized aerial-photographing method, attention is placed on a specific portion or a region of the target 5, the route and photographing setting information of the camera 4 and the like are set and controlled such that this specific portion is aerially photographed preferentially as a priority portion. For example, the user sets a specific portion or region of the target three-dimensional model on the settings screen as a priority portion beforehand. The specific portion is a portion in which, for example, it is known that deterioration and the like is likely to occur based on the knowledge of the user regarding the structure of the target 5 or previous diagnosis results. The detected deteriorated portion may be set as the priority portion based on the previous reference data.

Figure 21:
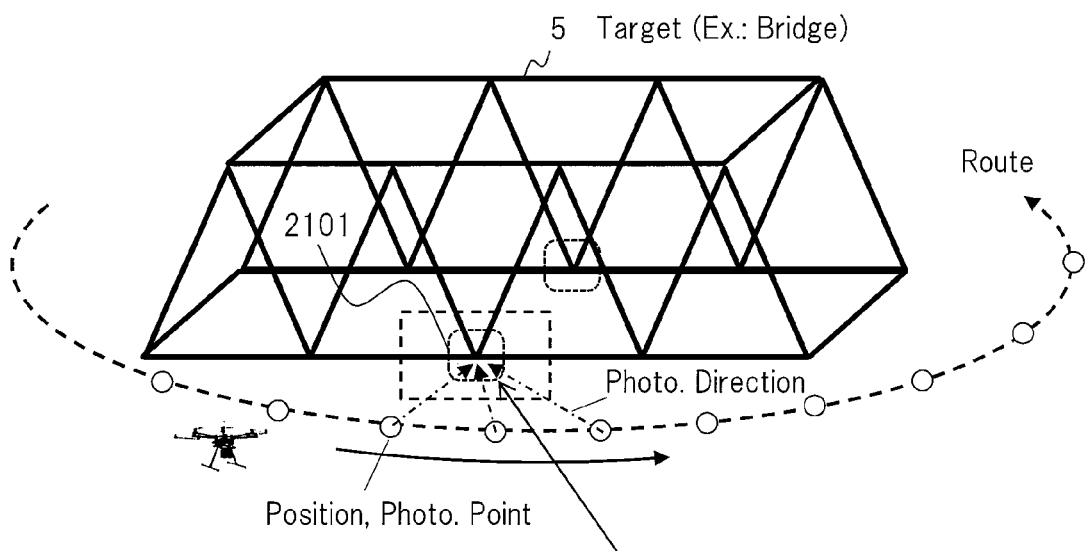
FIG. 21 is a drawing showing a prioritized aerial-photographing method according to a modification example of the embodiment.

FIG. 21 shows the prioritized aerial-photographing method. In the present example, the target 5 is a bridge. Based on the three-dimensional model structure and the like of the bridge, the portion where deterioration (such as cracks caused by stress concentration or corrosion caused by chemical reaction) is relatively likely to occur is set as the priority portion. The present example shows a priority portion 2101. Based on setting information of the priority portion, the computer system 100 sets the suitable route and the photographing setting information of the camera 4 for aerially photographing the priority portion preferentially. Here, a case where the photographing direction of the camera 4 and the photographing conditions are corrected based on the basic route. In the present example, the photographing direction of the camera 4 is set so as to be oriented toward the same priority portion of predetermined consecutive imaging points and positions on the route. At the time of the actual aerial photographing, the photographing direction of the camera 4 is controlled based on the photographing setting information.

Thus, the plurality of images including the priority portion can be obtained as the diagnostic image group. Examples include the plurality of images obtained by photographing the same priority portion. Thus, the computer system 100 can easily achieve the association and comparison processing for the priority portion and improve the diagnostic accuracy.

Different Embodiment

FIG. 22 shows aerially-photographed images of the target and the target three-dimensional mode of the diagnostic system of another embodiment of the present invention. A case where utility poles and electric wires are applied as targets is shown. In this embodiment, a contacting portion in a contacting state between the target (utility pole and electric wires) and another object (such as a tree) around the target is diagnosed and detected during diagnostic processing as the state and portion corresponding to the above-described deteriorated portion.

Part (A) of FIG. 22 shows an example of aerially-photographed images including the target. In the present example, the image includes two utility poles in the vicinity of a road, and electric wires passing through the two utility poles. The image also includes a tree as another object. It is possible that the electric wires and the tree are in contact with each other. The computer system 100 estimates and detects the contacting portion based on diagnostic processing including the association and comparison processing similar to that of the above-described embodiment. In a case where a possible contacting portion is detected from the two-dimensional image, the computer system 100 performs plotting from the two-dimensional information on the target three-dimensional model and displays the visualization screen.

At the time of diagnostic processing, it may difficult for the computer system 100 to detect, for example, the electric wires from the image since the electric wires are thin. This may make it difficult to determine contact between the electric wires and the tree. In this case, the computer system 100 devises the processing as follows.

The computer system 100 detects a predetermined target or another object from the previous and current aerially-photographed images by using the above-described comparison processing, SFM processing, machine learning or the like, and detects the possible contacting portion between the target and the other object. The computer system 100 calculates three-dimensional coordinates on the target three-dimensional model from the two-dimensional coordinates of the possible contacting portion, and plots on the target three-dimensional model. At this time, the possible contacting portion is visualized with a predetermined highlighting display.

In a case where no electric wires are detected from the aerially-photographed images, the computer system 100 obtains the three-dimensional coordinates of the two utility poles by detecting the two utility poles in the vicinity from the aerially-photographed images or the previous target three-dimensional model. The computer system 100 provisionally sets the electric wires connecting the tips of the two utility poles as the estimated position of the electric wires from the two utility poles in the three-dimensional area. The computer system 100 plots and displays the estimated electric wires on the target three-dimensional model. At this time, the estimated electric wires are visualized with a predetermined expression. Thus, the user can easily recognize the possible contacting portion via the screen. Therefore, inspection of electrical equipment and the like can be scheduled more easily.

Further, the computer system 100 determines a contacting state of the possible contacting portion between the estimated electric wires and an object such as a tree on the target three-dimensional model. The computer system 100 may calculate contact possibility as a numerical value and display it as a determined result for the user. For example, the computer system 100 determines the contacting state by roughly detecting the height of the other object such as the tree from the aerially-photographed images and comparing the height with the height of the estimated electric wires. Alternatively, the computer system 100 may determine the contacting state by restoring the three-dimensional structure (minutia) of the object such as the tree from the aerially-photographed images by the SFM processing or the like and comparing the estimated electric wires and the object such as the tree on the target three-dimensional model. Thus, the user can confirm contact possibility of the possible contacting portion via the screen.

In the foregoing, the present invention has been concretely described based on the embodiments. However, the present invention is not to be limited to the foregoing embodiments, and various modifications and alterations can be made without departing from the gist and scope of the present invention.

LIST OF REFERENCE SIGNS

1: drone, 2: PC, 3: server, 4: camera, 5: target, 21: drone controlling function, 22: diagnostic client program, 23: storage, 32: diagnostic server program, 33: DB, 100: computer system, 200: aircraft-utilizing deterioration diagnostic and deteriorated portion visualization software.

It is claimed:
1. An aircraft-utilizing deterioration diagnostic system configured to diagnose a state of a target including a deteriorated state by using photographing performed by an aircraft, the deterioration diagnostic system comprising:
the aircraft configured to be navigated along a route around the target, and having a camera configured to photograph the target; and
a computer system configured to control navigation of the aircraft and photographing by the camera;
wherein the computer system is configured to:
navigate the aircraft along the route at a predetermined date and time, acquire data from the aircraft including an image group obtained by consecutively photographing the target, and store the data in a DB;
associate, for the same target, images including the same portion in a current image and a previous image as comparison target images, based on diagnostic data including a diagnostic image group photographed at a current date and time, and based on reference data including a reference image group making reference to the DB and photographed at a previous date and time;
divide the images in the diagnostic image group and the images in the reference image group into a plurality of additional groups in time and space according to a category of the three-dimensional model of the target, the route, or a photographing direction of the camera;
at the time of the association, perform a first association between the additional groups;
after the first association, perform a second association of images in the additional groups;
compare the current image and the previous image among the comparison target images, and determine a difference therebetween to detect a deteriorated portion including the deteriorated state from the current image;
convert two-dimensional coordinates representing the deteriorated portion in the current image so as to be plotted on three-dimensional coordinates in a zone including a three-dimensional model of the target; and
generate a screen for visualizing diagnostic result information including the deteriorated portion in the zone after the conversion, and display the screen for a user.

2. The aircraft-utilizing deterioration diagnostic system according to claim 1,
wherein the computer system is further configured to:
at the time of the association, detect a plane portion from within each image among the diagnostic image group and the reference image group, and associate the plane portion of the current image and the plane portion of the previous image; and
at the time of the comparison, compare the plane portion of the current image and the plane portion of the previous image, and determine a difference therebetween to detect the deteriorated portion from the current image.

3. The aircraft-utilizing deterioration diagnostic system according to claim 1,
wherein the computer system is further configured to, at the time of the conversion, convert two-dimensional coordinates representing the deteriorated portion in each image of a plurality of images among the diagnostic image group into three-dimensional coordinates on the three-dimensional model of the target based on a perspective conversion matrix.

4. The aircraft-utilizing deterioration diagnostic system according to claim 1,
wherein the computer system is further configured to, at the time of the conversion, determine a plane conversion coefficient for converting a first plane portion detected from within a first image of a plurality of images among the diagnostic image group into a second plane portion detected from within a second image of a plurality of images among the diagnostic image group, and determine two-dimensional coordinates representing the deteriorated portion in the second plane portion from two-dimensional coordinates representing deteriorated portion in the first plane portion by using the plane conversion coefficient.

5. The aircraft-utilizing deterioration diagnostic system according to claim 1,
wherein the computer system is further configured to generate a screen for visualizing a change in time series including comparison between the previous image and the current image regarding the deteriorated portion of the target.

6. The aircraft-utilizing deterioration diagnostic system according to claim 1,
wherein the computer system is further configured to:
navigate the aircraft along the route at the predetermined date and time, and store, in the DB, sensor data including the date and time, the route and position information of the aircraft at the time of the photographing, and data including photographing setting information of the camera; and
generate and preset data including the route or the photographing setting information for the current or future date and time based on the data of the previous date and time, so as to photograph a target area of the target considering light and wind conditions around the target.

7. The aircraft-utilizing deterioration diagnostic system according to claim 1,
wherein the computer system is further configured to, at the time of navigating the aircraft along the route and photographing, determine a degree of overlapping between the current image and the previous image for each control point, and perform controls for correcting photographing setting information of the camera or navigation control parameters of the aircraft so as to maximize the degree of overlapping.

8. The aircraft-utilizing deterioration diagnostic system according to claim 1,
wherein the computer system is further configured to:
divide the diagnostic image group into a plurality of parts in time and space according to a category of the three-dimensional model of the target, the route, or a photographing direction of the camera; and
at the time of the conversion and for each of the parts, convert two-dimensional coordinates representing the deteriorated portion in each image of the plurality of images among the diagnostic image group into three-dimensional coordinates on the three-dimensional model of the target based on a perspective conversion matrix, and integrate the conversion result for each of the parts.

9. The aircraft-utilizing deterioration diagnostic system according to claim 1,
wherein the computer system is further configured to:
set a specific region of the target as a region to be preferentially photographed;
set photographing setting information including photographing direction of the camera according to settings of the region to be preferentially photographed; and
at the time of navigating the aircraft along the route and photographing, control the photographing direction of the camera so as to be oriented toward the region to be preferentially photographed at a plurality of consecutive time points.

10. The aircraft-utilizing deterioration diagnostic system according to claim 1,
wherein the computer system is further configured to, at the time of the association and comparison, use machine learning.

11. The aircraft-utilizing deterioration diagnostic system according to claim 1,
wherein the computer system is further configured to:
at the time of the comparison, determine a contacting state between the target and another object, and detect a contacting portion in the contacting state from the current image;
at the time of the conversion, convert two-dimensional coordinates representing the contacting portion in the current image so as to be plotted on three-dimensional coordinates in an area including the three-dimensional model of the target; and
generate a screen for visualizing diagnostic result information including the contacting portion in the area after the conversion, and display the screen for the user.

12. An aircraft-utilizing deterioration diagnostic system configured to diagnose a state of a target including a deteriorated state by using photographing performed by an aircraft, the deterioration diagnostic system comprising:
the aircraft configured to be navigated along a route around the target, and having a camera configured to photograph the target; and
a computer system configured to control navigation of the aircraft and photographing by the camera;
wherein the computer system is configured to:
navigate the aircraft along the route at a predetermined date and time, acquire data from the aircraft including an image group obtained by consecutively photographing the target, and store the data in a DB;
associate, for the same target, images including the same portion in a current image and a previous image as comparison target images, based on diagnostic data including a diagnostic image group photographed at a current date and time, and based on reference data including a reference image group making reference to the DB and photographed at a previous date and time;
at the time of navigating the aircraft along the route and photographing, determine a degree of overlapping between the current image and the previous image for each control point, and perform controls for correcting photographing setting information of the camera or navigation control parameters of the aircraft so as to maximize the degree of overlapping;
compare the current image and the previous image among the comparison target images, and determine a difference therebetween to detect a deteriorated portion including the deteriorated state from the current image;
convert two-dimensional coordinates representing the deteriorated portion in the current image so as to be plotted on three-dimensional coordinates in a zone including a three-dimensional model of the target; and generate a screen for visualizing diagnostic result information including the deteriorated portion in the zone after the conversion, and display the screen for a user.

13. The aircraft-utilizing deterioration diagnostic system according to claim 12, wherein the computer system is further configured to, at the time of the association and comparison, use machine learning.

14. The aircraft-utilizing deterioration diagnostic system according to claim 12, wherein the computer system is further configured to, at the time of the conversion, determine a plane conversion coefficient for converting a first plane portion detected from within a first image of a plurality of images among the diagnostic image group into a second plane portion detected from within a second image of a plurality of images among the diagnostic image group, and determine two-dimensional coordinates representing the deteriorated portion in the second plane portion from two-dimensional coordinates representing the deteriorated portion in the first plane portion by using the plane conversion coefficient.

15. The aircraft-utilizing deterioration diagnostic system according to claim 12, wherein the computer system is further configured to:
at the time of the association, detect a plane portion from within each image among the diagnostic image group and the reference image group, and associate the plane portion of the current image and the plane portion of the previous image; and at the time of the comparison, compare the plane portion of the current image and the plane portion of the previous image, and determine a difference therebetween to detect the deteriorated portion from the current image.

16. The aircraft-utilizing deterioration diagnostic system according to claim 12, wherein the computer system is further configured to, at the time of the conversion, convert two-dimensional coordinates representing the deteriorated portion in each image of a plurality of images among the diagnostic image group into three-dimensional coordinates on the three-dimensional model of the target based on a perspective conversion matrix.

17. The aircraft-utilizing deterioration diagnostic system according to claim 12, wherein the computer system is further configured to generate a screen for visualizing a change in time series including comparison between the previous image and the current image regarding the deteriorated portion of the target.

18. The aircraft-utilizing deterioration diagnostic system according to claim 12, wherein the computer system is further configured to:
navigate the aircraft along the route at the predetermined date and time, and store, in the DB, sensor data including the date and time, the route and position information of the aircraft at the time of the photographing, and data including photographing setting information of the camera; and generate and preset data including the route or the photographing setting information for the current or future date and time based on the data of the previous date and time, so as to photograph a target area of the target considering light and wind conditions around the target.

19. The aircraft-utilizing deterioration diagnostic system according to claim 12, wherein the computer system is further configured to:
divide the diagnostic image group into a plurality of parts in time and space according to a category of the three-dimensional model of the target, the route, or a photographing direction of the camera; and at the time of the conversion and for each of the parts, convert two-dimensional coordinates representing the deteriorated portion in each image of the plurality of images among the diagnostic image group into three-dimensional coordinates on the three-dimensional model of the target based on a perspective conversion matrix, and integrate the conversion result for each of the parts.

* * * * *